US012665287B2

(12) United States Patent
Sano

(10) Patent No.: US 12,665,287 B2
(45) Date of Patent: Jun. 23, 2026

(54) ANTENNA DEVICE AND WIRELESS DEVICE

(71) Applicant: KABUSHIKI KAISHA TOSHIBA, Tokyo (JP)

(72) Inventor: Makoto Sano, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 239 days.

(21) Appl. No.: 18/454,799

(22) Filed: Aug. 24, 2023

(65) Prior Publication Data

US 2024/0250408 A1 Jul. 25, 2024

(30) Foreign Application Priority Data

Jan. 25, 2023 (JP) ................................ 2023-009520
Aug. 4, 2023 (JP) ................................ 2023-127481

(51) Int. Cl.
*H01Q 1/22* (2006.01)
*H01Q 1/44* (2006.01)
*H01Q 23/00* (2006.01)

(52) U.S. Cl.
CPC ............. *H01Q 1/2291* (2013.01); *H01Q 1/44* (2013.01); *H01Q 23/00* (2013.01)

(58) Field of Classification Search
CPC ........ H01Q 1/2291; H01Q 1/44; H01Q 23/00; H01Q 9/0435; H01Q 21/065; H01Q 21/245; H01Q 3/36
See application file for complete search history.

(56) References Cited

U.S. PATENT DOCUMENTS 11,081,793 B2 8/2021 Sano
11,735,833 B2 * 8/2023 Wang .................. H01Q 1/2291 342/361

(Continued)

FOREIGN PATENT DOCUMENTS

JP H0878947 A 3/1996
JP 3010208 B2 2/2000

(Continued)

OTHER PUBLICATIONS

Japanese Office Action (and an English language translation thereof) dated Nov. 10, 2025, issued in counterpart Japanese Application No. 2023-127481.

*Primary Examiner* — Dameon E Levi
*Assistant Examiner* — Michael M Bouizza
(74) *Attorney, Agent, or Firm* — Holtz, Holtz & Volek PC

(57) ABSTRACT

According to one embodiment, an antenna device includes a first antenna part, a first power divider, and a first control circuit. The first antenna part includes first antenna elements, first phase shifters for left-handed circular polarized wave, and first phase shifters for right-handed circular polarized wave. The plurality of first antenna elements performs a first transmitting operation of transmitting a transmitting-left-handed circularly polarized wave, and a second transmitting operation of transmitting a transmitting-right-handed circularly polarized wave. The first power divider is couplable with the plurality of first phase shifters for left-handed circular polarized wave and the plurality of first phase shifters for right-handed circular polarized wave. The first control circuit controls phase shift amounts of the plurality of first phase shifters for left-handed circular polarized wave and controls phase shift amounts of the plurality of first phase shifters for right-handed circular polarized wave.

15 Claims, 22 Drawing Sheets

(56) References Cited

U.S. PATENT DOCUMENTS

| | | | | |
|---|---|---|---|---|
| 2019/0081685 | A1* | 3/2019 | Sano | H01Q 21/245 |
| 2020/0411983 | A1 | 12/2020 | Sano | |
| 2021/0135365 | A1* | 5/2021 | Tsutsumi | H01Q 3/36 |
| 2022/0115790 | A1 | 4/2022 | Ueda | |
| 2022/0302603 | A1* | 9/2022 | Chieh | H01Q 3/36 |

FOREIGN PATENT DOCUMENTS

| | | | |
|---|---|---|---|
| JP | 2021010068 | A | 1/2021 |
| JP | 7064471 | B2 | 4/2022 |
| JP | 2022064624 | A | 4/2022 |

* cited by examiner

ANTENNA DEVICE AND WIRELESS DEVICE

CROSS-REFERENCE TO RELATED APPLICATIONS

This application is based upon and claims the benefit of priority from Japanese Patent Application No. 2023-009520, filed on Jan. 25, 2023, and Japanese Patent Application No. 2023-127481, filed on Aug. 4, 2023; the entire contents of which are incorporated herein by reference.

FIELD

Embodiments described herein relate generally to an antenna device and a wireless device.

BACKGROUND

For example, it is desirable to improve characteristics of an antenna device and a wireless device.

DETAILED DESCRIPTION

Figure 1:
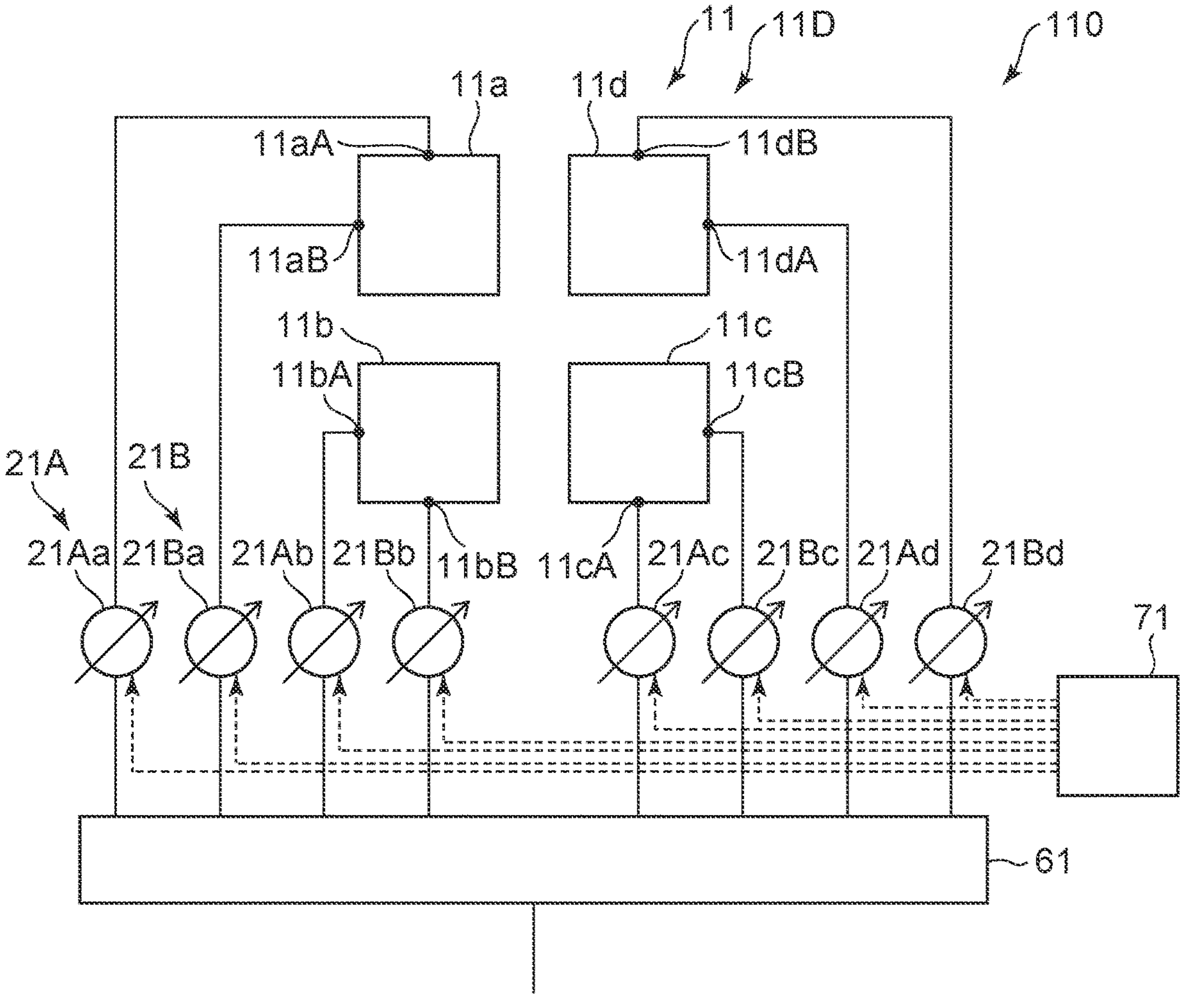
FIG. 1 is a schematic view illustrating an antenna device according to a first embodiment.

According to one embodiment, an antenna device includes a first antenna part, a first power divider, and a first control circuit. The first antenna part includes a plurality of first antenna elements, a plurality of first phase shifters for left-handed circular polarized wave, and a plurality of first phase shifters for right-handed circular polarized wave. The plurality of first antenna elements are configured to perform a first transmitting operation of transmitting a transmitting-left-handed circularly polarized wave, and a second transmitting operation of transmitting a transmitting-right-handed circularly polarized wave. One of the plurality of first phase shifters for left-handed circular polarized wave is configured to change a phase of the transmitting-left-handed circularly polarized wave of one of the plurality of first antenna elements. One of the plurality of first phase shifters for right-handed circular polarized wave is configured to change a phase of the transmitting-right-handed circularly polarized wave of the one of the plurality of first antenna elements. The first power divider is couplable with the plurality of first phase shifters for left-handed circular polarized wave and the plurality of first phase shifters for right-handed circular polarized wave. An orientation of the one of the plurality of first antenna elements is different from an orientation of an other one of the plurality of first antenna elements. The first control circuit is configured to control phase shift amounts of the plurality of first phase shifters for left-handed circular polarized wave so that a plurality of the transmitting-left-handed circularly polarized waves corresponding to the plurality of first antenna elements is substantially in-phase in a transmitting direction of a transmitted electromagnetic wave including the transmitting-left-handed circularly polarized waves and the transmitting-right-handed circularly polarized waves. The first control circuit is configured to control phase shift amounts of the plurality of first phase shifters for right-handed circular polarized wave so that a plurality of the transmitting-right-handed circularly polarized waves corresponding to the plurality of first antenna elements is substantially in-phase in the transmitting direction.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic view illustrating an antenna device according to a first embodiment.

As shown in FIG. 1, the antenna device 110 according to the embodiment includes a first antenna part 11D, a first power divider 61, and a first control circuit 71.

The first antenna part 11D includes multiple first antenna elements 11, multiple first phase shifters for left-handed circular polarized wave 21A, and multiple first phase shifters for right-handed circular polarized wave 21B.

The multiple first antenna elements 11 include, for example, an antenna element 11*a*, an antenna element 11*b*, an antenna element 11*c*, an antenna element 11*d*, etc. The number of the multiple first antenna elements 11 is arbitrary.

The multiple first antenna elements 11 are configured to perform a first transmitting operation and a second transmitting operation. The multiple first antenna elements 11 may perform these operations separately, or the multiple first antenna elements 11 may perform these operations simultaneously.

In the first transmitting operation, the multiple first antenna elements 11 transmit transmitting-left-handed circularly polarized waves. In the second transmitting operation, the multiple first antenna elements 11 transmit transmitting-right-handed circularly polarized waves.

The multiple first phase shifters for left-handed circular polarized wave 21A include, for example, a phase shifter 21Aa, a phase shifter 21Ab, a phase shifter 21Ac, a phase shifter 21Ad, etc. The number of the multiple first phase shifters for left-handed circular polarized wave 21A is arbitrary. One of the multiple first phase shifters for left-handed circular polarized wave 21A is configured to change the phase of the transmitting-left-handed circularly polarized wave of one of the multiple first antenna elements 11. For example, the multiple first phase shifters for left-handed circular polarized wave 21A are respectively configured to change the phases of the transmitting-left-handed circularly polarized waves of the multiple first antenna elements 11.

The multiple first phase shifters for right-handed circular polarized wave 21B include, for example, a phase shifter 21Ba, a phase shifter 21Bb, a phase shifter 21Bc, a phase shifter 21Bd, etc. The number of the multiple first phase shifters for right-handed circular polarized wave 21B is arbitrary. One of the multiple first phase shifters for right-handed circular polarized wave 21B is configured to change a phase of the transmitting-right-handed circularly polarized wave of one of the multiple first antenna elements 11. For example, the multiple first phase shifters for right-handed circular polarized wave 21B are respectively configured to change the phases of the transmitting-right-handed circularly polarized waves of the multiple first antenna elements 11.

The first power divider 61 is couplable with the multiple first phase shifters for left-handed circular polarized wave 21A and the multiple first phase shifters for right-handed circular polarized wave 21B. For example, the first power divider 61 is electrically connected with the multiple first phase shifters for left-handed circular polarized wave 21A and the multiple first phase shifters for right-handed circular polarized wave 21B.

As described below, the orientation (e.g., the angle) of one of the multiple first antenna elements 11 is different from the orientation (e.g., the angle) of another one of the multiple first antenna elements 11.

The first control circuit 71 is configured to control the phase shift amounts of the multiple first phase shifters for left-handed circular polarized wave 21A so that the multiple transmitting-left-handed circularly polarized waves corresponding to the multiple first antenna elements 11 are substantially in-phase in the transmitting direction of a transmitted electromagnetic wave including the transmitting-left-handed circularly polarized wave and the transmitting-right-handed circularly polarized wave.

The first control circuit 71 is configured to control the phase shift amounts of the multiple first phase shifters for right-handed circular polarized wave 21B so that the multiple transmitting-right-handed circularly polarized waves corresponding to the multiple first antenna elements 11 are substantially in-phase in the transmitting direction.

For example, the multiple first antenna elements 11 each are provided to be rotated to mutually-different orientations. Accordingly, for example, the axial ratio when radiating a circularly polarized wave can have a wide bandwidth.

According to the embodiment, the phase shifters are controlled to cause the circularly polarized wave components radiated by the multiple first antenna elements 11 to be in-phase. Accordingly, for example, good circularly polarized radiation characteristics are obtained even when there exist manufacturing error of the antenna elements, mutual coupling between the multiple antenna elements, characteristic fluctuation of the phase shifters, etc.

In a first reference example, a phased array includes multiple linearly polarized antenna elements in a rotated arrangement. In the phased array, phase shifters change the feed phases of the antenna elements to perform beam scanning of a right-handed circularly polarized wave or left-handed circularly polarized wave. The change of the feed phases is performed based on the positions of the antenna elements, the rotation angles of the antenna elements, and the beam pointing directions of the antenna elements.

Because such a first reference example uses linearly polarized antenna elements, the frequency band for the axial ratio is narrower than that of circularly polarized antenna elements. A right-handed circularly polarized wave and a left-handed circularly polarized wave cannot be radiated simultaneously. In the first reference example, the excitation phases of the antenna elements are controlled based on the positions of the antenna elements, the rotation angles of the antenna elements, and the beam pointing directions of the antenna elements. Therefore, the radiation fields of the antenna elements are likely to change when the positions and rotation angles of the antenna elements change due to manufacturing error. When the radiation fields of the antenna elements change, the characteristic fluctuation of the phase shifters and the like easily cause degradation of the axial ratio when radiating the circularly polarized wave.

In a second reference example, a phased array uses multiple dual-circularly polarized antenna elements. In the second reference example, the antenna element alone can radiate a right-handed circularly polarized wave and a left-handed circularly polarized wave. In the second reference example, the antenna elements are arranged with the same orientation and are not rotated.

In the second reference example, the frequency band for the axial ratio when radiating the circularly polarized wave is narrow because the multiple antenna elements do not have a rotated arrangement. Because the excitation phase of the right-handed circularly polarized element and the excitation phase of the left-handed circularly polarized element of each antenna element are equal, the radiation characteristics degrade when the elements are rotated to improve the axial ratio.

In contrast, according to the embodiment, good circularly polarized radiation characteristics are obtained even when there exist manufacturing error, mutual coupling between antenna elements, characteristic fluctuation of phase shifters, etc. For example, the embodiment is applicable to a phased array in which dual-circularly polarized antenna elements have a rotated arrangement. According to the embodiment, an antenna device can be provided in which the characteristics can be improved.

As shown in FIG. 1, the antenna element 11*a* includes a feed point 11*a*A and a feed point 11*a*B. The antenna element 11*b* includes a feed point 11*b*A and a feed point 11*b*B. The antenna element 11*c* includes a feed point 11*c*A and a feed point 11*c*B. The antenna element 11*d* includes a feed point 11*d*A and a feed point 11*d*B.

For example, the phase shifter 21Aa is coupled (connected) with the feed point 11*a*A. The phase shifter 21Ab is coupled (connected) with the feed point 11*b*A. The phase shifter 21Ac is coupled (connected) with the feed point 11*c*A. The phase shifter 21Ad is coupled (connected) with the feed point 11*d*A. Left-handed circularly polarized waves are radiated by supplying high-frequency signals to these feed points.

For example, the phase shifter 21Ba is coupled (connected) with the feed point 11*a*B. The phase shifter 21Bb is coupled (connected) with the feed point 11*b*B. The phase shifter 21Bc is coupled (connected) with the feed point 11*c*B. The phase shifter 21Bd is coupled (connected) with the feed point 11*d*B. Right-handed circularly polarized waves are radiated by supplying high-frequency signals to these feed points.

For example, patch antennas, horn antennas, tapered slot antennas, dielectric resonator antennas, etc., are applicable to the multiple first antenna elements 11.

In the example of FIG. 1, the antenna element 11*b* is rotated 90° counterclockwise with respect to the antenna element 11*a*. The antenna element 11*c* is rotated 90° counterclockwise with respect to the antenna element 11*b*. The antenna element 11*d* is rotated 90° with respect to the antenna element 11*c*.

Figure 2:
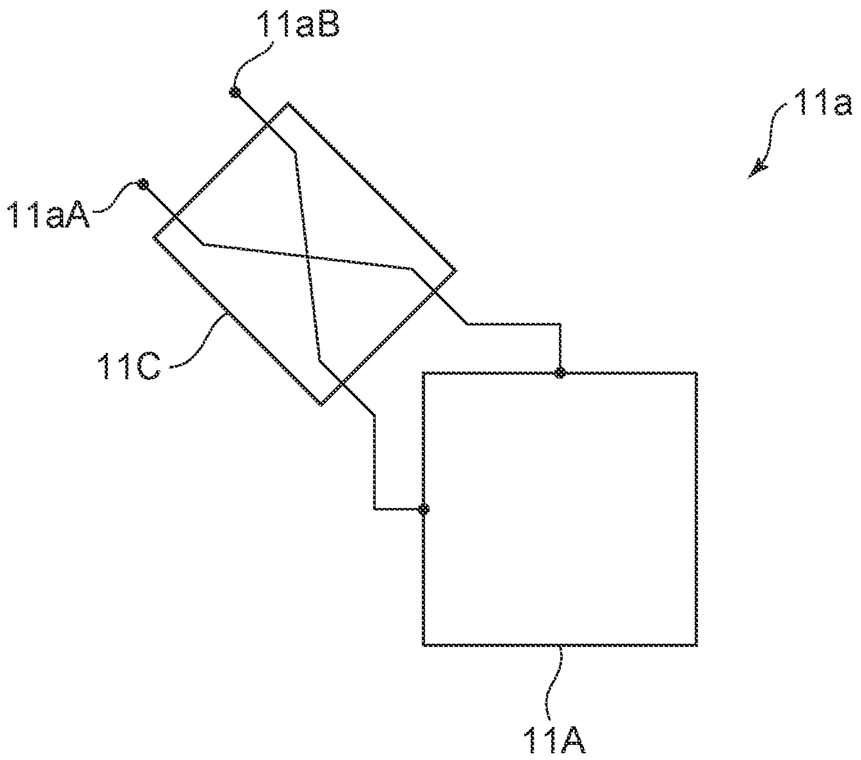
FIG. 2 is a schematic view illustrating a portion of the antenna device according to the first embodiment.

FIG. 2 is a schematic view illustrating a portion of the antenna device according to the first embodiment.

FIG. 2 illustrates one of the multiple first antenna elements 11 (the antenna element 11*a*). As shown in FIG. 2, a 90° hybrid coupler 11C is connected to a dual-linearly polarized antenna 11A. A left-handed circularly polarized wave and a right-handed circularly polarized wave can be radiated thereby.

The configuration of one of the multiple first antenna elements 11 may be the same as the configuration of another one of the multiple first antenna elements 11. The configuration of the one of the multiple first antenna elements 11 may be different from the configuration of the other one of the multiple first antenna elements 11. For example, the multiple first antenna elements 11 may be provided in one plane. For example, the multiple first antenna elements 11 may be located at one curved surface. The multiple first antenna elements 11 are provided to be rotated to mutually-different orientations.

FIGS. 3A to 3D are schematic views illustrating portions of the antenna device according to the first embodiment.

Figure 3A:
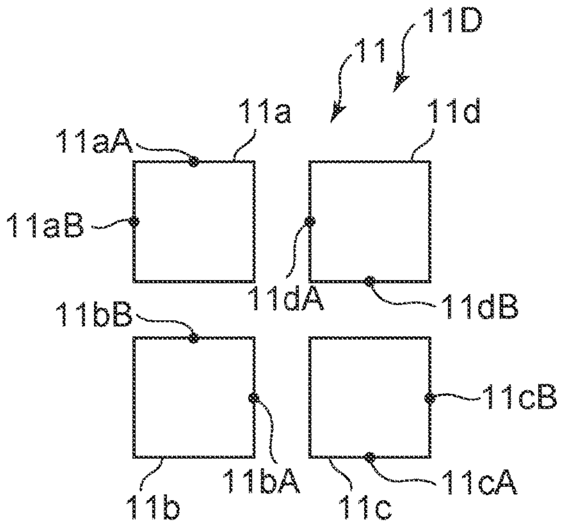
FIGS. 3A to 3D are schematic views illustrating portions of the antenna device according to the first embodiment.
Figure 3B:
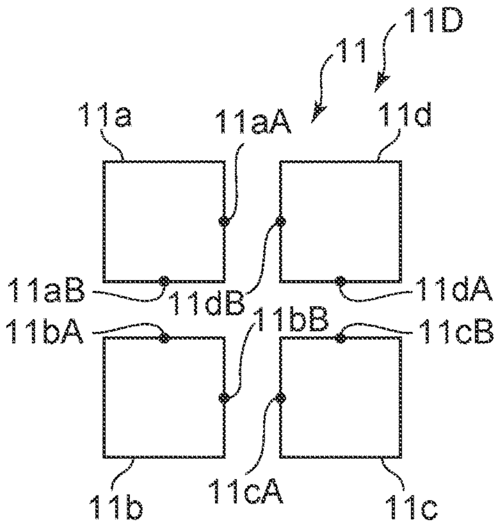
Figure 3C:
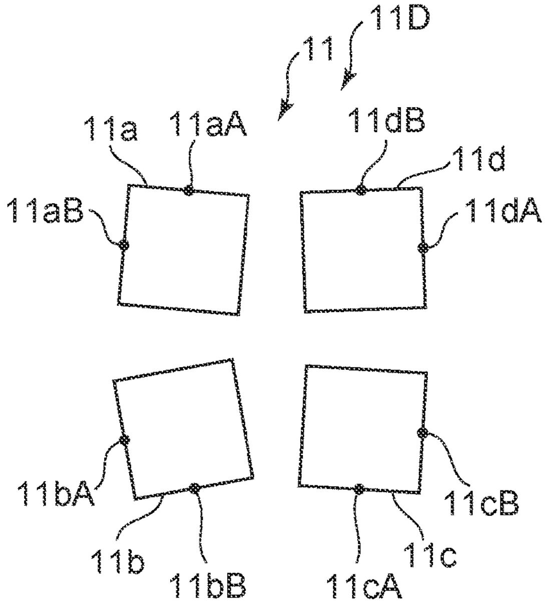

In the example of FIG. 3A, the multiple first antenna elements 11 are provided to be rotated clockwise. In the example of FIG. 3B, the feed points are positioned between the multiple first antenna elements 11. In the example of FIG. 3C, the orientations (e.g., the angles) of the multiple first antenna elements 11 are not 90°, and are tilted.

Figure 3D:
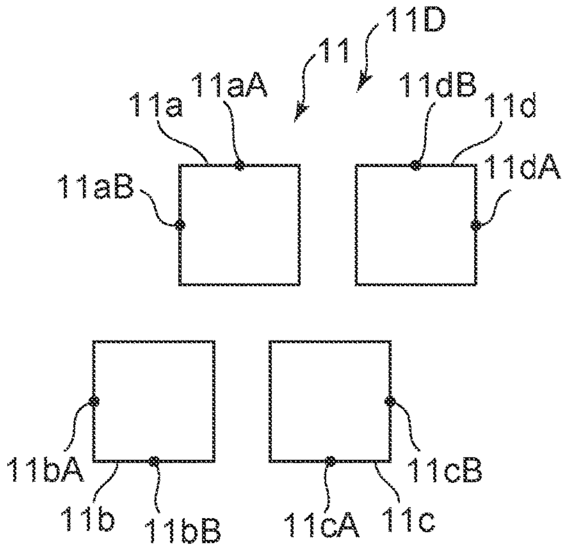

In the example of FIG. 3D, the positions of the multiple first antenna elements 11 are shifted. The arrangement of the multiple first antenna elements 11 is a triangular array. The triangular array makes it possible to increase the element spacing. For example, the gain improves. For example, fewer elements are necessary to obtain the same aperture area. A lower cost is possible.

Figure 4A:
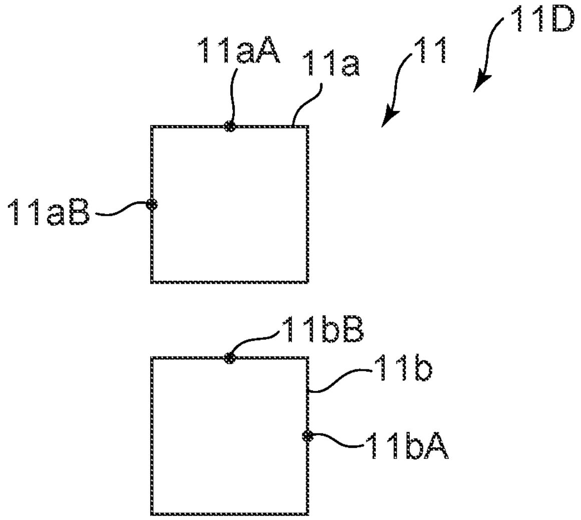
FIGS. 4A and 4B are schematic views illustrating portions of the antenna device according to the first embodiment.
Figure 4B:
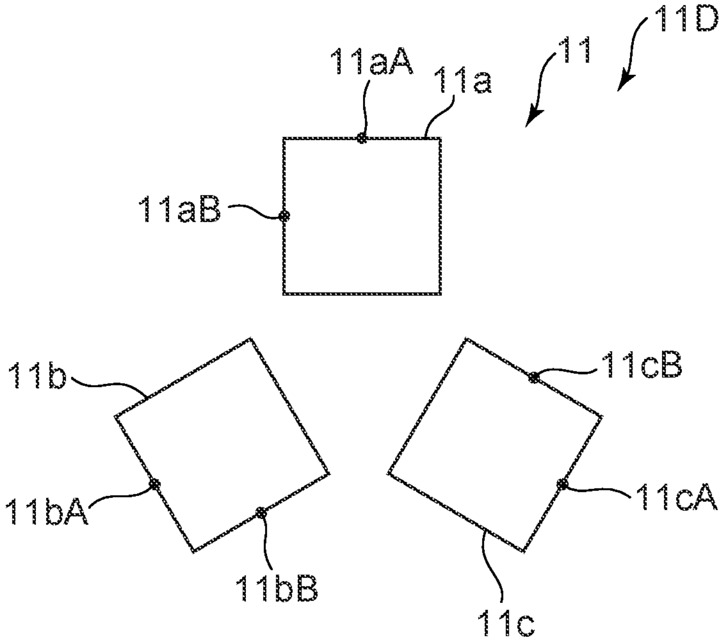

FIGS. 4A and 4B are schematic views illustrating portions of the antenna device according to the first embodiment.

As shown in FIG. 4A, the number of the multiple first antenna elements 11 may be two. As shown in FIG. 4B, the number of the multiple first antenna elements 11 may be three. By increasing the number of the multiple first antenna elements 11, a good axial ratio is obtained in a wider frequency bandwidth range.

For example, the number of the multiple first antenna elements 11 may be "N". "N" is an integer not less than 2. The multiple first antenna elements 11 include an nth first antenna element. "n" is an integer not less than 1 and not more than "N". In such a case, the rotation angle of the nth first antenna element may be $180° \times i \times n/N$. "i" is an integer not less than 1. For example, better circularly polarized radiation characteristics are obtained by the multiple first antenna elements 11 having axial symmetry. For example, rotation angles of uniform spacing are applicable to the multiple first antenna elements 11.

When the number of the multiple first antenna elements 11 is "N", the number of the multiple first phase shifters for left-handed circular polarized wave 21A may be "N". When the number of the multiple first antenna elements 11 is "N", the number of the multiple first phase shifters for right-handed circular polarized wave 21B may be "N".

A case where the number of the multiple first antenna elements 11 is four will now be described.

For example, the phase shifter 21Aa changes the phase of the left-handed circularly polarized wave radiated by the antenna element 11*a*. The phase shifter 21Ba changes the phase of the right-handed circularly polarized wave radiated by the antenna element 11*a*. The operations of the other phase shifters are similar.

The multiple first phase shifters for left-handed circular polarized wave 21A and the multiple first phase shifters for right-handed circular polarized wave 21B may include, for example, switched-line phase shifters, reflection-type phase shifters, loaded-line phase shifters, etc. The multiple first phase shifters for left-handed circular polarized wave 21A change the phases of the left-handed circularly polarized wave continuously or discretely. The multiple first phase shifters for right-handed circular polarized wave 21B change the phases of the right-handed circularly polarized waves continuously or discretely.

A high-frequency signal is input to the first power divider 61. The first power divider 61 distributes the input high-frequency signal to the multiple first phase shifters for left-handed circular polarized wave 21A as left-handed circularly polarized signals. The first power divider 61 distributes the input high-frequency signal to the multiple first phase shifters for right-handed circular polarized wave 21B as right-handed circularly polarized signals. One of the multiple distributions may be performed.

Figure 5:
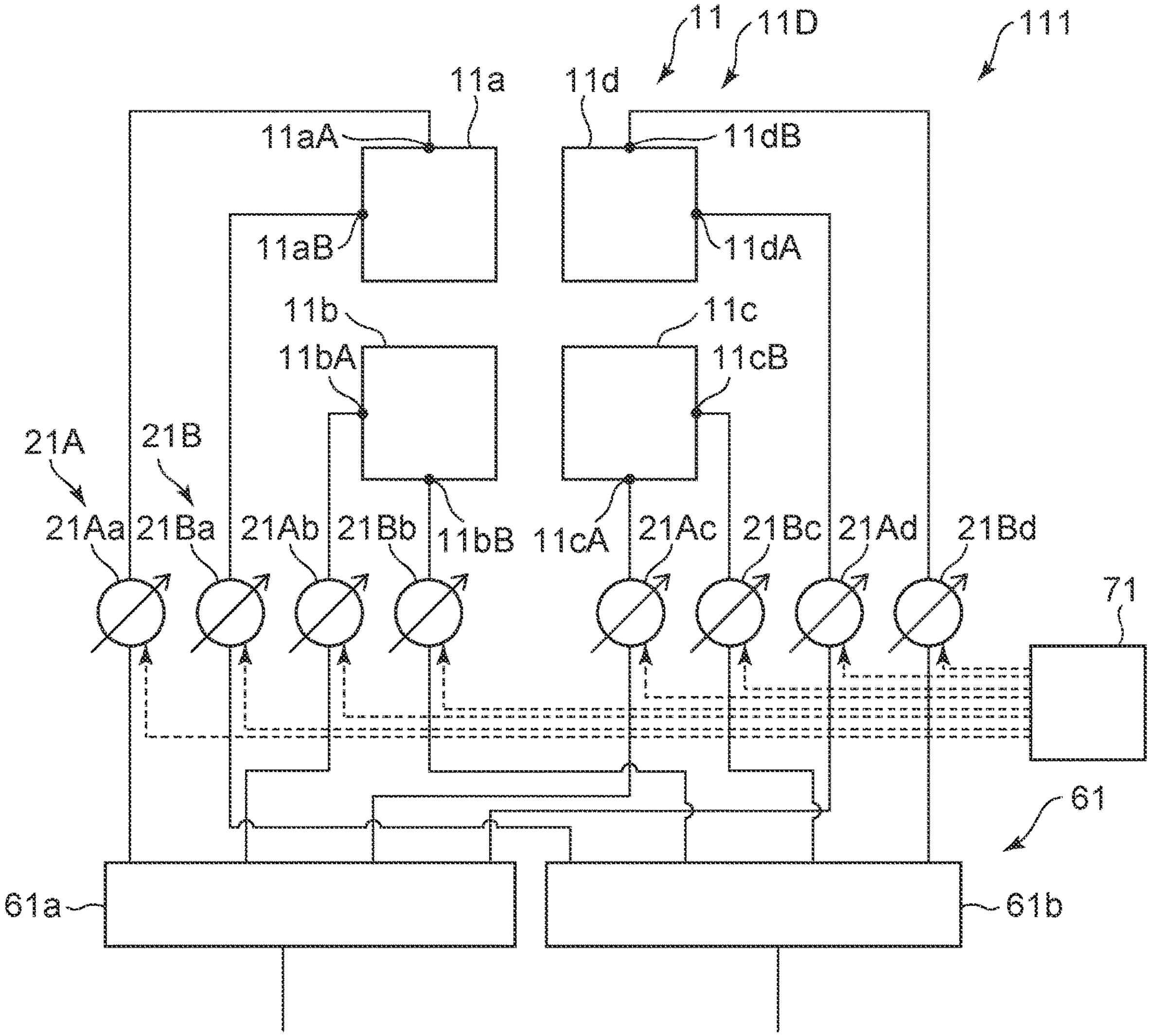
FIG. 5 is a schematic view illustrating an antenna device according to the first embodiment.

FIG. 5 is a schematic view illustrating an antenna device according to the first embodiment.

As shown in FIG. 5, in the antenna device 111, the first power divider 61 includes a divider 61*a* and a divider 61*b*. The divider 61*a* distributes the input high-frequency signal to the multiple first phase shifters for left-handed circular polarized wave 21A as left-handed circularly polarized signals. The divider 61*b* distributes the input high-frequency signal to the multiple first phase shifters for right-handed circular polarized wave 21B as right-handed circularly polarized signals.

At least one of the first power divider 61, the divider 61*a*, or the divider 61*b* may include, for example, a T-junction, a Wilkinson divider, a hybrid coupler, etc.

The first control circuit 71 determines the phase shift amounts of the multiple first phase shifters for left-handed circular polarized wave 21A and the multiple first phase shifters for right-handed circular polarized wave 21B based on the beam pointing direction, etc. The first control circuit 71 may include, for example, a microcomputer, a FPGA, a computer, etc.

An example of an operation of the antenna device 110 (or the antenna device 111) will now be described. An example of the excitation coefficients of the multiple first antenna elements 11 when radiating-left-handed circularly polarized waves will now be described.

The multiple first antenna elements 11 include the antenna element 11*a*, the antenna element 11*b*, the antenna element 11*c*, and the antenna element 11*d*. Power is fed to the feed point 11*a*A with an excitation coefficient $c_{L1}=1$. Power is fed to the feed point 11*b*A with an excitation coefficient $c_{L2}=1$. Power is fed to the feed point 11*c*A with an excitation coefficient $c_{L3}=1$. Power is fed to the feed point 11*d*A with an excitation coefficient $c_{L4}=1$. In such a case, the radiation fields at the desired beam pointing direction $(\theta, \phi)=(\theta_0, \phi_0)$ are taken as $E_{L1}$, $E_{L2}$, $E_{L3}$, and $E_{L4}$.

For example, a radiation field $E_{Li}$ (i=1, . . . , 4) are obtained by measuring the electromagnetic field radiated by the antenna device 110 in the desired beam pointing direction $(\theta_0, \phi_0)$ when exciting the four feed points. For example, the radiation field $E_{Li}$ (i=1, . . . , 4) may be obtained based on electromagnetic field analysis or an analytical solution.

For example, the radiation field $E_{Li}$ (i=1, . . . , 4) that corresponds to the four feed points may be obtained by feeding power simultaneously to the antenna device 110 from the multiple feed points, measuring the electromagnetic field radiated by the antenna device 110 in the desired beam pointing direction $(\theta_0, \phi_0)$ while changing the states of the four phase shifters, and performing signal processing.

For example, the rotating element electric field vector method is applicable to the signal processing for obtaining the radiation field. For example, the radiation field $E_{Li}$ (i=1, . . . , 4) that includes characteristic fluctuation of the phase shifters or the characteristics of the power dividers can be obtained by feeding power simultaneously from the multiple feed points and by changing the states of the phase shifters.

The left-handed circularly polarized wave component $E_{Li,L}$ of the radiation field $E_{Li}$ (i=1, . . . , 4) is obtained by the following first formula.

$$E_{Li,L} = \frac{1}{\sqrt{2}}(a_\theta - ja_\phi)\cdot E_{Li} \tag{1}$$

In the first formula, "a" and "$a_\phi$" are unit vectors respectively of the θ-direction and the ϕ-direction.

When radiating the left-handed circularly polarized waves, the phases $\arg(c_{L2})$, $\arg(c_{L3})$, and $\arg(c_{L4})$ of the feed points 11*b*A, 11*c*A, and 11*d*A are set based on the following second formula, third formula, and fourth formula.

$$\arg(c_{L2}) = \arg\left(\frac{E_{L1,L}}{E_{L2,L}}c_{L1}\right) \tag{2}$$

$$\arg(c_{L3}) = \arg\left(\frac{E_{L1,L}}{E_{L3,L}}c_{L1}\right) \tag{3}$$

$$\arg(c_{L4}) = \arg\left(\frac{E_{L1,L}}{E_{L4,L}}c_{L1}\right) \tag{4}$$

The excitation coefficient cui may be set to any value.

The amplitudes of the excitation coefficients $c_{L1}$, $c_{L2}$, $c_{L3}$, and $c_{L4}$ may be set to be equal. The amplitudes of the excitation coefficients may be different from each other.

Power is fed to the antenna device 110 by the excitation coefficients based on the second, third, and fourth formulas. The left-handed circularly polarized wave components of the radiation fields of the antenna elements are thereby synthesized to be in-phase in the desired beam pointing direction. A good axial ratio is obtained. Because the excitation coefficients are obtained based on the radiation field, a good axial ratio is obtained even when there exist manufacturing error of the antenna elements, mutual coupling, characteristic fluctuation of the phase shifters, etc.

An example of the excitation coefficients of the multiple first antenna elements 11 when radiating the right-handed circularly polarized waves will now be described.

Power is fed to the feed point 11*a*B with an excitation coefficient $c_{R1}=1$. Power is fed to the feed point 11*b*B with an excitation coefficient $c_{R2}=1$. Power is fed to the feed point 11*c*B with an excitation coefficient $c_{R3}=1$. Power is fed to the feed point 11*d*B with an excitation coefficient $c_{R4}=1$. In such a case, the radiation fields in the desired beam pointing direction $(\theta, \phi)=(\theta_0, \phi_0)$ are taken as $E_{R1}$, $E_{R2}$, $E_{R3}$, and $E_{R4}$.

A radiation field $E_{Ri}$ (i=1, . . . , 4) may be obtained by measuring the electromagnetic field radiated by the antenna device 110 in the desired beam pointing direction $(\theta_0, \phi_0)$ when exciting each of the four feed points. The radiation field $E_{Ri}$ (i=1, . . . , 4) may be obtained based on electromagnetic field analysis or an analytical solution.

For example, the radiation field $E_{Ri}$ (i=1, . . . , 4) that corresponds to each feed point may be obtained by feeding power to the antenna device 110 simultaneously from the multiple feed points, by measuring the electromagnetic field radiated by the antenna device 110 in the $(\theta_0, \phi_0)$ direction while changing the states of the four phase shifters, and by performing signal processing. For example, the radiation field $E_{Ri}$ (i=1, . . . , 4) that includes the characteristic fluctuation of the phase shifters or characteristics of the power dividers may be obtained by feeding power simultaneously from the multiple feed points and changing the states of the phase shifters.

The right-handed circularly polarized wave component $E_{Ri,R}$ of the radiation field $E_{Ri}$ (i=1, . . . , 4) is obtained using the following fifth formula.

$$E_{Ri,R} = \frac{1}{\sqrt{2}}(a_\theta + ja_\phi)\cdot E_{Ri} \tag{5}$$

In the fifth formula, "a" and "$a_\phi$" are respectively unit vectors of the θ-direction and the ϕ-direction. When radiating the right-handed circularly polarized wave, the phases arg $(c_{R2})$, $\arg(c_{R3})$, and $\arg(c_{R4})$ of the feed points 11*b*B, 11*c*B, and 11*d*B are determined based on the following sixth formula, seventh formula, and eighth formula.

$$\arg(c_{R2}) = \arg\left(\frac{E_{R1,R}}{E_{R2,R}} c_{R1}\right) \tag{6}$$

$$\arg(c_{R3}) = \arg\left(\frac{E_{R1,R}}{E_{R3,R}} c_{R1}\right) \tag{7}$$

$$\arg(c_{R4}) = \arg\left(\frac{E_{R1,R}}{E_{R4,R}} c_{R1}\right) \tag{8}$$

The excitation coefficient $c_{R1}$ may be set to any value.

The amplitudes of the excitation coefficients $c_{R1}$, $c_{R2}$, $c_{R3}$, and $c_{R4}$ may be set to be equal. The amplitudes of the excitation coefficients may be different from each other.

Power is fed to the antenna device 110 by the excitation coefficients based on the sixth, seventh, and eighth formulas. The right-handed circularly polarized wave components of the radiation fields of the antenna elements are thereby synthesized to be in-phase in the desired beam pointing direction. A good axial ratio is obtained. Because the excitation coefficients are obtained based on the radiation fields, a good axial ratio is obtained even when there exist manufacturing error of the antenna elements, mutual coupling, characteristic fluctuation of the phase shifters, etc.

Figure 6:
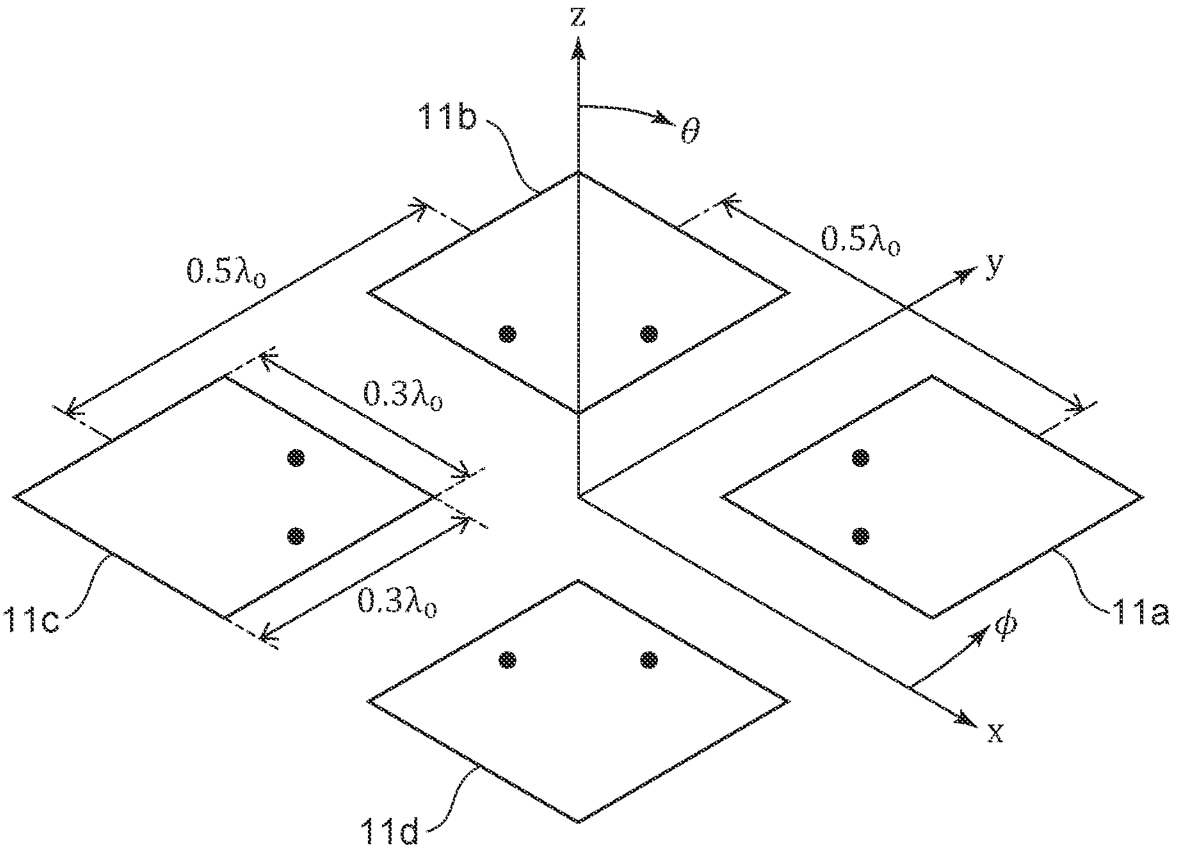
FIG. 6 is a schematic view illustrating the antenna device according to the first embodiment.
Figure 7:
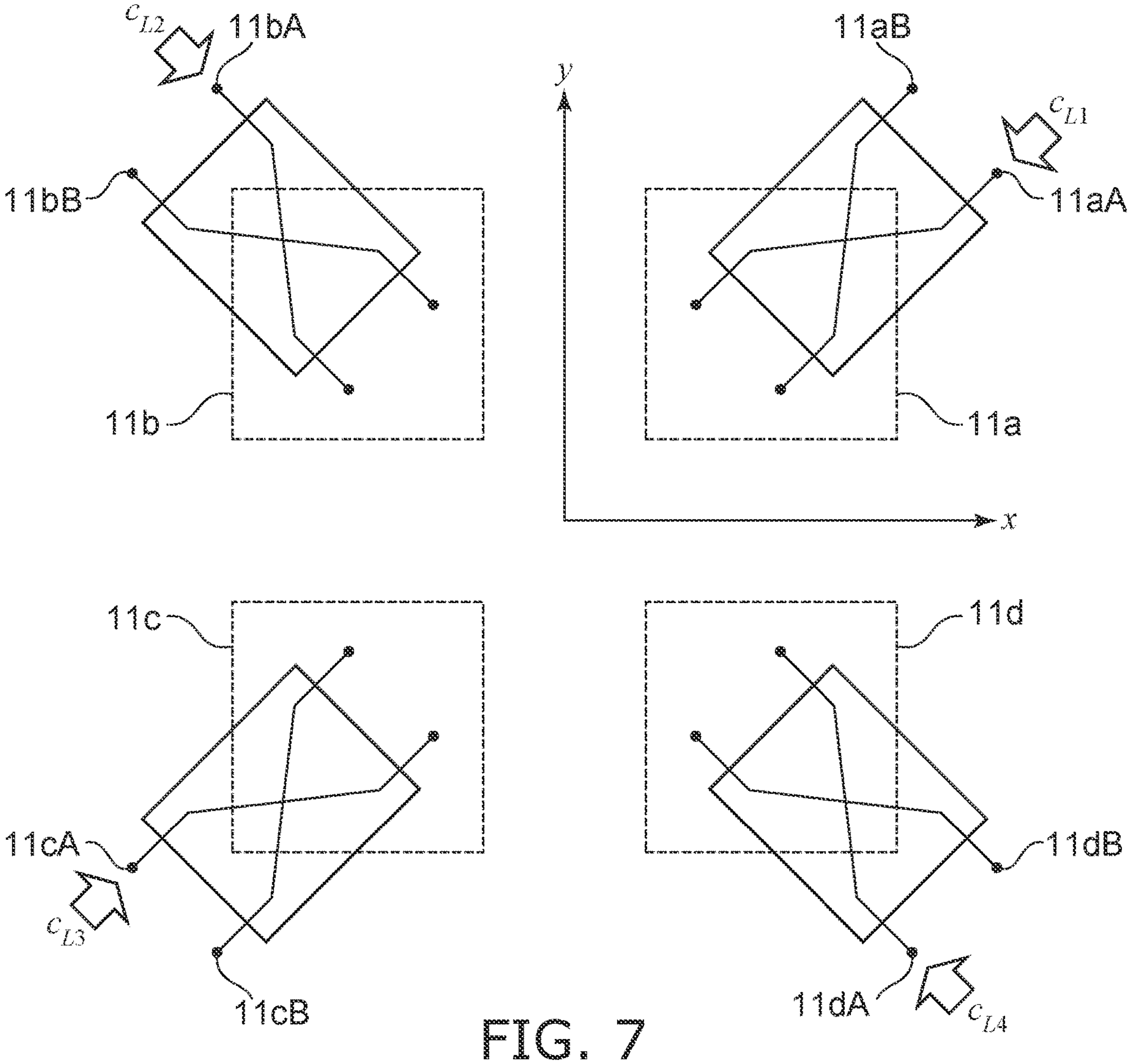
FIG. 7 is a schematic view illustrating the antenna device according to the first embodiment.

FIGS. 6 and 7 are schematic views illustrating the antenna device according to the first embodiment.

These drawings illustrate a portion of the antenna device 110. In these drawings, power is fed to four rectangular patch antenna elements by using 90° hybrid couplers 11C.

A square array is applied in the example. The four $0.3\lambda_0$ rectangular patch antennas are provided to be rotated 90° at a spacing of $0.5\lambda_0$. "λ0" is the free-space wavelength at the center frequency.

The analytical field of the radiation fields of the rectangular patch antennas are provided with phases to simulate the effects of manufacturing error of the antenna device 110, etc. The phase error includes a standard deviation of 1 dB and a standard deviation of 5°. In the example, the desired beam pointing angle $(\theta_0, \phi_0)$ is (30°, 45°). $|c_{L1}|$, $|c_{L2}|$, $|c_{L3}|$, and $|c_{L4}|$ are set to 1. The phase $\arg(c_{L1})$ related to $c_{L1}$ is set to 0°.

Examples of characteristics of a first configuration CF1 and a second configuration CF2 will now be described. In the first configuration, the phases of the excitation coefficients of the feed points 11*a*A, 11*b*A, 11*c*A, and 11*d*A are determined by the second to fifth formulas. In the second configuration CF2, the excitation coefficients of these feed points are determined as in the first reference example. In the first reference example, the phases of the excitation coefficients are determined based on the positions of the antenna elements, the rotation angles of the antenna elements, and the beam pointing direction.

Figure 8A:
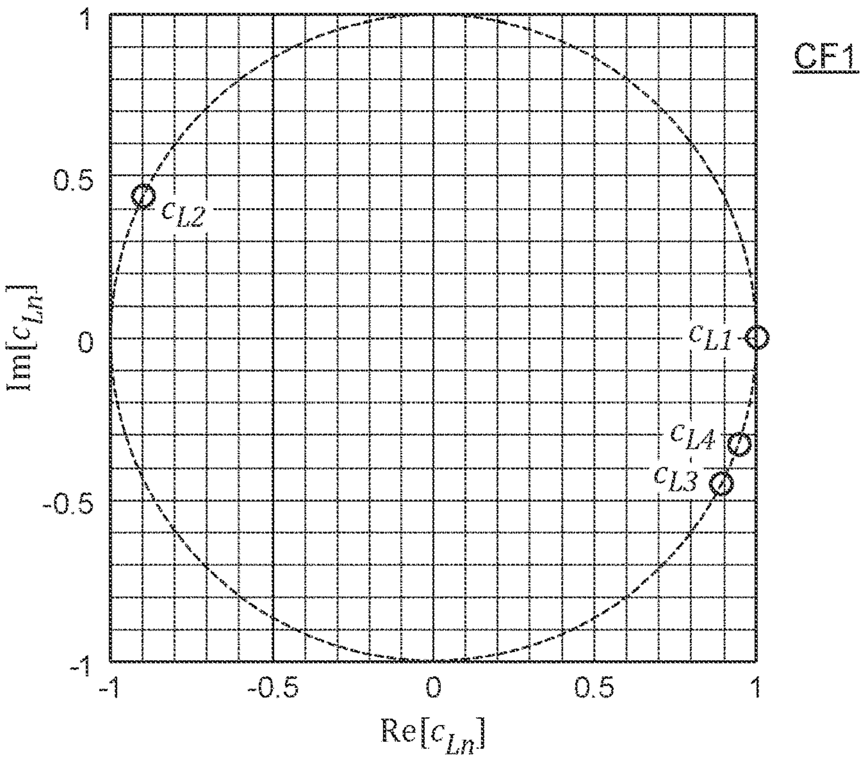
FIGS. 8A and 8B are schematic views illustrating characteristics of the antenna devices.
Figure 8B:
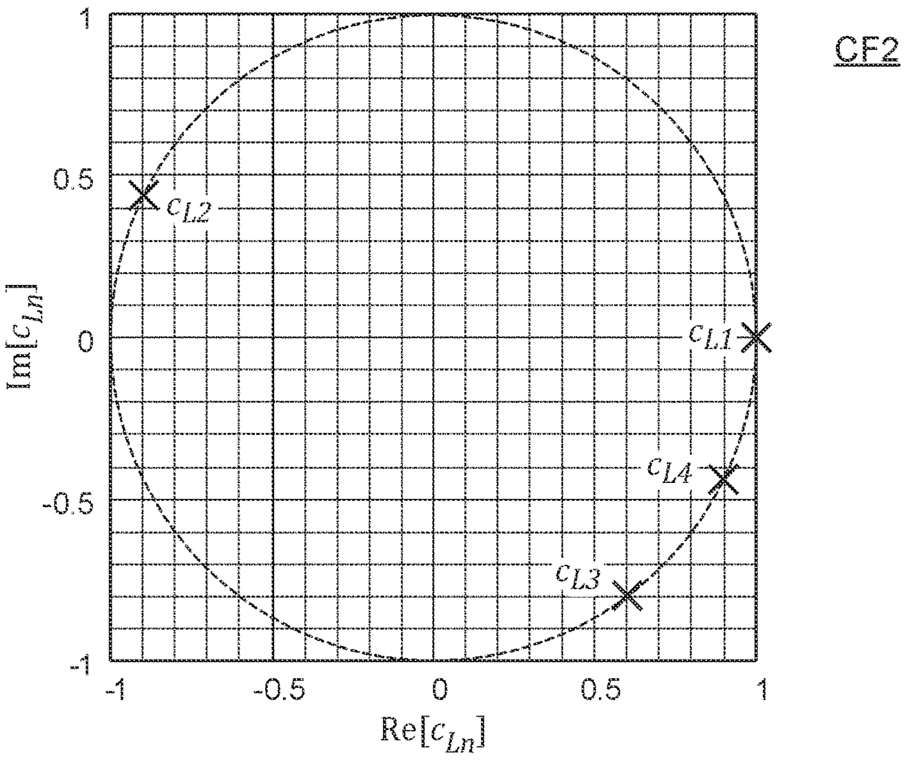

FIGS. 8A and 8B are schematic views illustrating characteristics of the antenna devices.

FIG. 8A corresponds to the first configuration CF1. FIG. 8B corresponds to the second configuration CF2. Four excitation coefficients are illustrated in these drawings. In these drawings, the horizontal axis is the real part of the excitation coefficient. In these drawings, the vertical axis is the imaginary part of the excitation coefficient.

Figure 9:
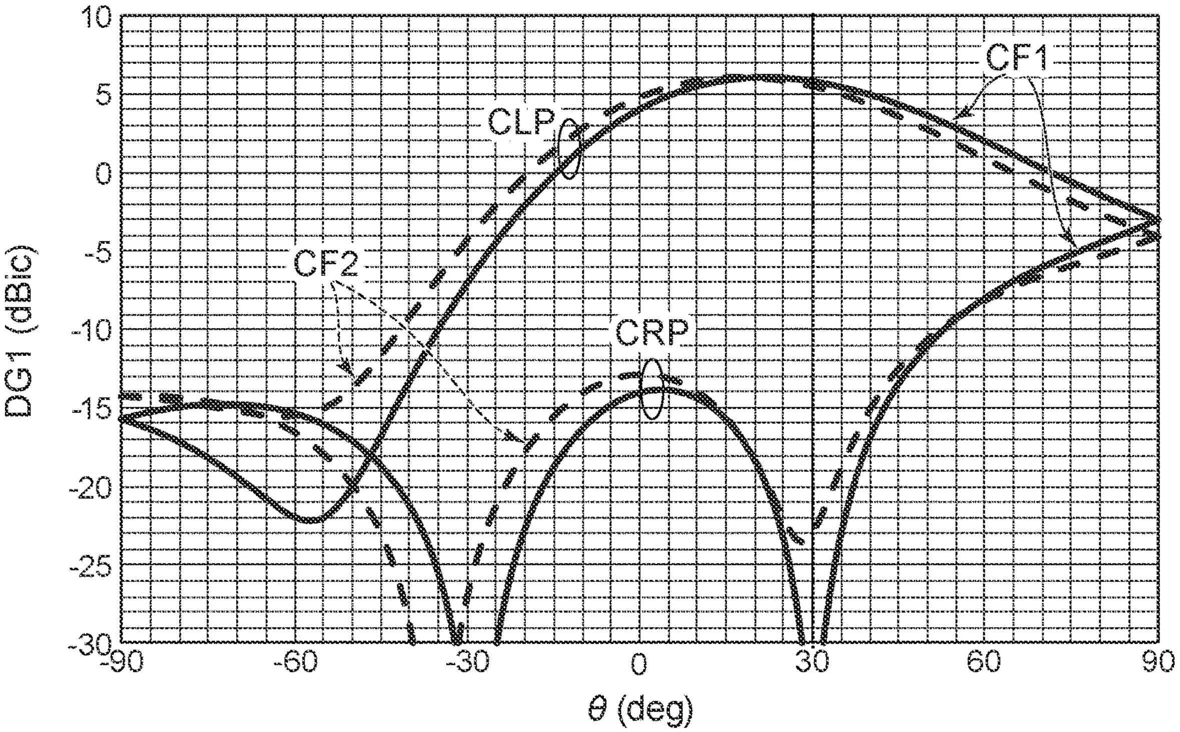
FIG. 9 is a graph illustrating characteristics of the antenna devices.

FIG. 9 is a graph illustrating characteristics of the antenna devices.

FIG. 9 illustrates the directivities of the radiation fields of the antenna elements considering manufacturing error of the antenna device 110, etc. The horizontal axis of FIG. 9 is the angle θ. The vertical axis is a directivity DG1. In FIG. 9, the solid line corresponds to the first configuration CF1. The broken line corresponds to the second configuration CF2. In the first configuration CF1, the four excitation coefficients are set so that the left-handed circularly polarized wave components of the radiation fields of the four antenna elements are in-phase in the $(\theta_0, \phi_0)$=(30°, 45°) direction. FIG. 9 illustrates a left-handed circularly polarized wave component CLP and a right-handed circularly polarized wave component CRP.

As shown in FIG. 9, by setting the excitation coefficients based on the radiation fields (in the first configuration CF1), the left-handed circularly polarized wave component CLP of the directivity DG1 approaches the major beam direction (θ=30°). By setting the excitation coefficients based on the radiation fields, the right-handed circularly polarized wave component CRP in the $\theta_0$=30° direction is reduced.

Figure 10:
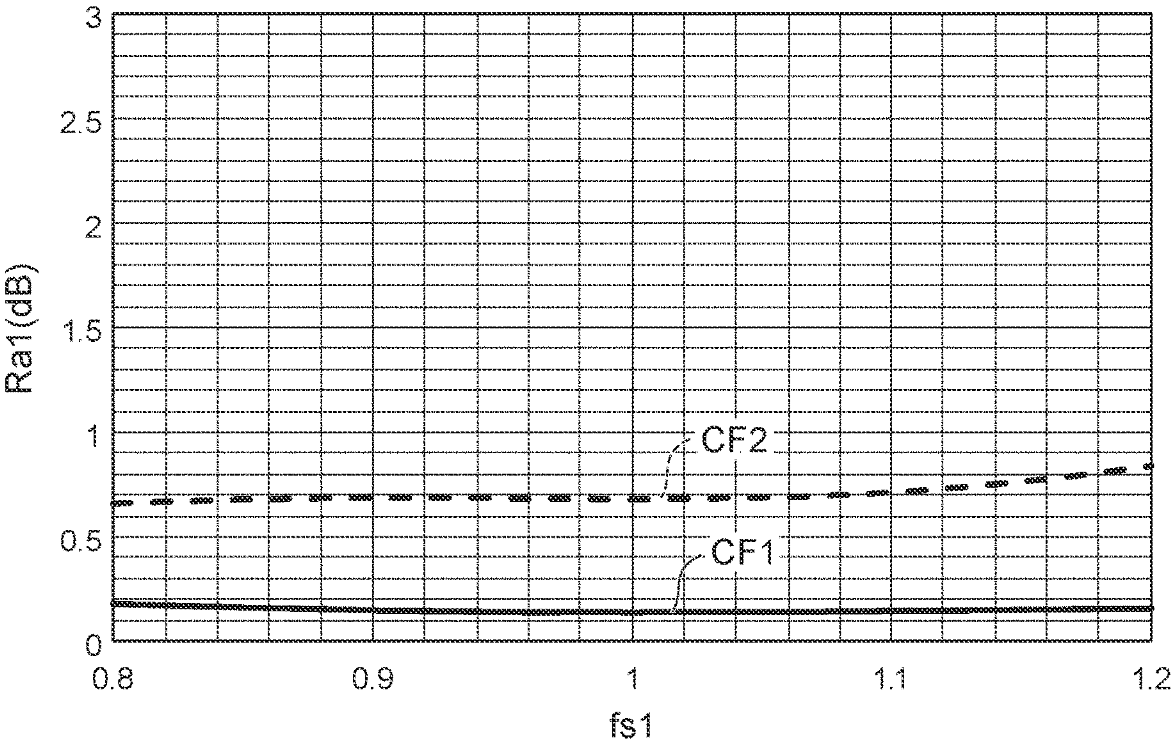
FIG. 10 is a graph illustrating characteristics of the antenna devices.

FIG. 10 is a graph illustrating characteristics of the antenna devices.

FIG. 10 shows the frequency characteristics of the axial ratio in the $(\theta_0, \phi_0)$=(30°, 45°) direction. The horizontal axis is a normalized frequency fs1. The vertical axis is an axial ratio Ra1. FIG. 10 illustrates the characteristics of the first and second configurations CF1 and CF2.

By setting the excitation coefficients so that the radiation fields are in-phase as shown in FIG. 10 (the first configuration CF1), a low axial ratio Ra1 is obtained over a wide frequency band.

For example, the phase shifter 21Aa, the phase shifter 21Ab, the phase shifter 21Ac, and the phase shifter 21Ad may be digital phase shifters. In such a case, the phase shift amounts are discrete. In such a case, it may not be possible to apply the excitation phases obtained using the second to fourth formulas. For example, the step of the phase shift amount in a six-bit phase shifter is 5.625°. For example, the step of the phase shift amount in a four-bit phase shifter is 22.5°. In such a case, a quantization error is generated.

Figure 11:
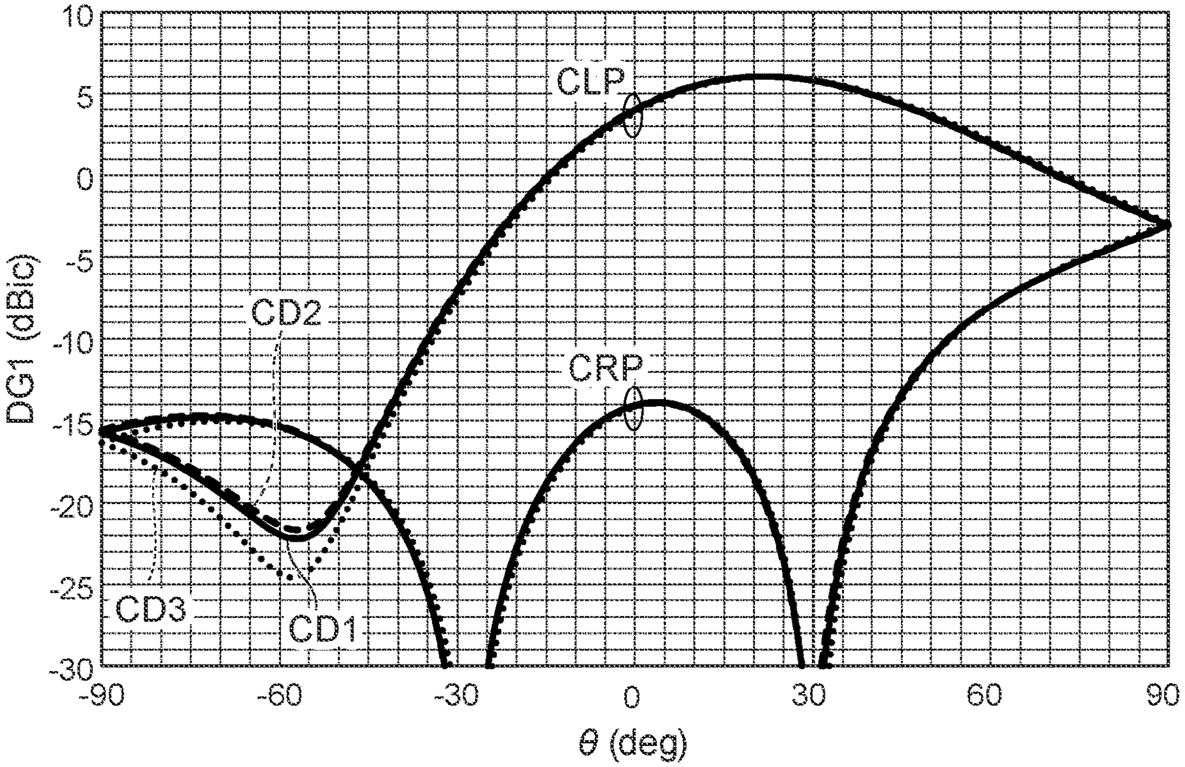
FIG. 11 is a graph illustrating characteristics of the antenna device.

FIG. 11 is a graph illustrating characteristics of the antenna device.

FIG. 11 illustrates the directivity DG1 for a first condition CD1, a second condition CD2, and a third condition CD3. The first condition CD1 has no quantization error of the excitation phases. In the second condition CD2, the excitation phases are set by being quantized using six bits. In the third condition CD3, the excitation phases are set by being quantized using four bits.

As shown in FIG. 11, neither the major beam direction nor the radiation directivity characteristics change greatly, even when the excitation phases are quantized.

Figure 12:
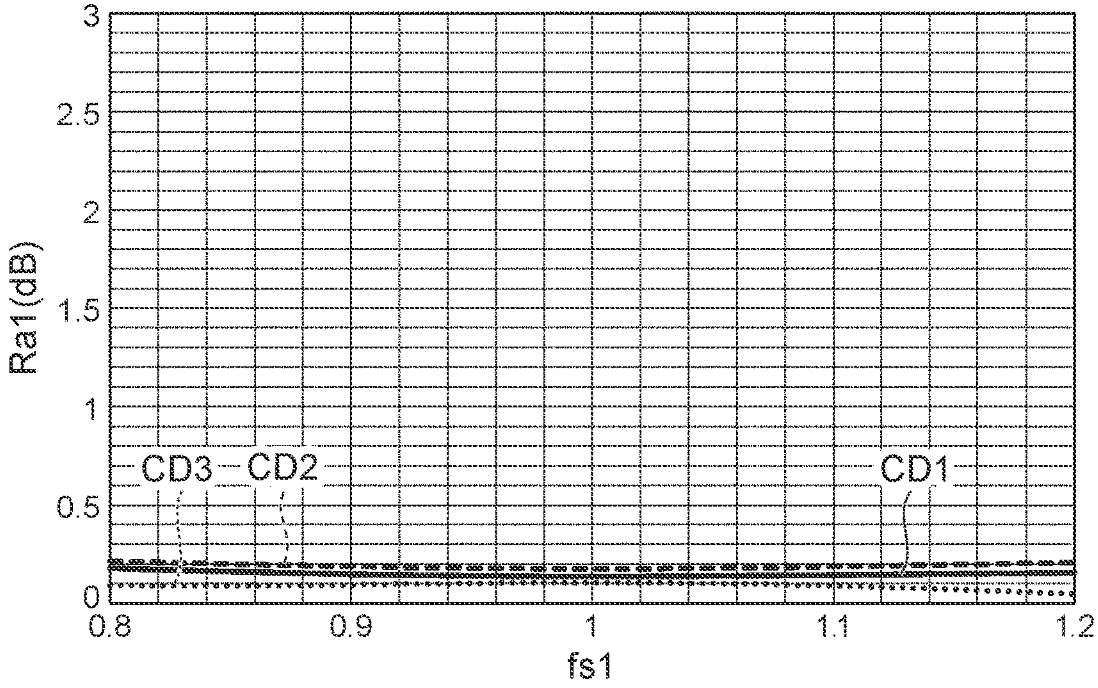
FIG. 12 is a graph illustrating characteristics of the antenna device.

FIG. 12 is a graph illustrating characteristics of the antenna device.

FIG. 12 illustrates the axial ratio Ra1 for the first condition CD1, the second condition CD2, and the third condition CD3. By using these conditions as shown in FIG. 12, the axial ratio Ra1 in the (θ0, ϕ0)=(30°, 45°) direction is low in a wide frequency range even when the excitation coefficients are quantized.

Accordingly, a good configuration is obtained even when the excitation phases that are used are not exactly based on the second to fourth formulas. For example, a quantization error caused by discretization of the excitation phases using six bits, four bits, etc., may exist. In such a case as well, the left-handed circularly polarized wave components of the radiation fields are synthesized to be substantially in-phase in the desired beam pointing direction. Thereby, a good axial ratio Ra1 is obtained in a wide frequency range.

The radiation of the right-handed circularly polarized waves is similar to when radiating the left-handed circularly polarized waves. A good configuration is obtained even when the excitation phases that are used are not exactly based on the sixth to eighth formulas. Even when the excitation phases are discretized, the right-handed circularly polarized wave components of the radiation fields of the antenna elements may be synthesized to be substantially in-phase in the desired beam pointing direction. A good axial ratio Ra1 is thereby obtained in a wide frequency range.

Thus, for example, errors caused by the quantization of the phase shift amounts of the digital phase shifters may exist. For example, the excitation phases may be changed by changing the phase shift amounts of the phase shifters based on the measurement errors related to the antenna elements. The excitation phases may be changed by changing the phase shift amounts of the phase shifters due to temperature changes of the antenna elements, etc.

Thus, a good axial ratio Ra1 is obtained in a wide frequency range as long as the excitation phases are substantially equal to the values based on the second to fourth formulas. A good axial ratio Ra1 is obtained in a wide frequency range as long as the excitation phases are substantially equal to the values based on the sixth to eighth formulas.

The radiation field in the desired beam pointing direction ($\theta_0$, $\phi_0$) may be obtained by interpolating radiation fields in directions near the desired beam pointing direction ($\theta_0$, $\phi_0$). The excitation coefficients may be obtained based on the radiation field obtained by the interpolation. The excitation coefficients for radiating the circularly polarized waves in the desired beam pointing direction ($\theta_0$, $\phi_0$) may be obtained by interpolating excitation coefficients in directions near the desired beam pointing direction ($\theta_0$, $\phi_0$).

According to the embodiment, for example, when power is fed simultaneously to the eight feed points, the left-handed circularly polarized waves and the right-handed circularly polarized waves are synthesized to generate a linearly polarized wave. The polarization plane of the linearly polarized wave can be rotated by relatively changing the phases of the left-handed circularly polarized waves and the phases of the right-handed circularly polarized waves. For example, the polarization plane is rotated 45° by changing the phases of the left-handed circularly polarized waves and the phases of the right-handed circularly polarized waves relatively 90°.

Thus, the transmitted linearly polarized wave may be generatable by the multiple first antenna elements 11 simultaneously radiating the transmitting-left-handed circularly polarized waves and the transmitting-right-handed circularly polarized waves. The first control circuit may be configured to change the relative phase shift amount of at least one of the multiple first phase shifters for left-handed circular polarized wave 21A and at least one of the multiple first phase shifters for right-handed circular polarized wave 21B based on the transmitted linearly polarized wave radiated by the multiple first antenna elements 11. The polarization angle of the linearly polarized wave can be effectively controlled.

Figure 13:
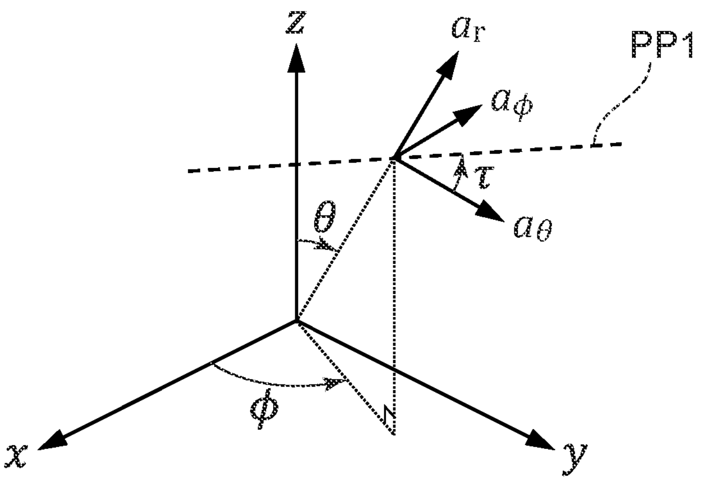
FIG. 13 is a schematic view illustrating the coordinate system related to the antenna device according to the first embodiment.

FIG. 13 is a schematic view illustrating the coordinate system related to the antenna device according to the first embodiment. As shown in FIG. 13, the angle of a polarization plane PP1 in the beam pointing direction ($\theta$, $\phi$) is taken as a polarization angle $\tau$. "$a_r$", "$a_\theta$", and "$a_\phi$" are respectively unit vectors in the r-direction, the $\theta$-direction, and the $\phi$-direction in the spherical coordinate system.

Figure 14:
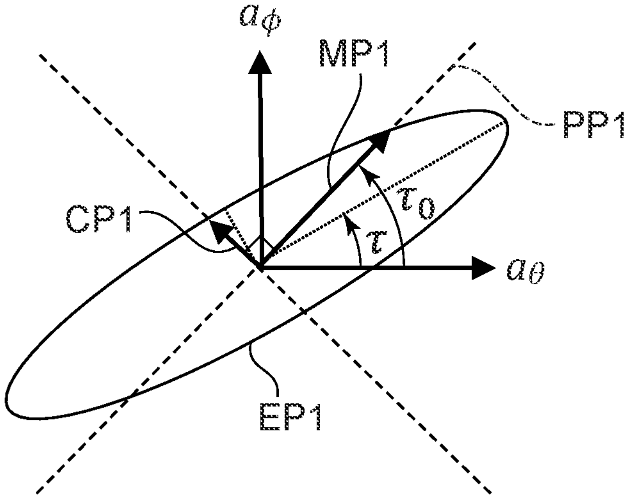
FIG. 14 is a schematic view illustrating the polarized wave of the antenna device according to the first embodiment.

FIG. 14 is a schematic view illustrating the polarized wave of the antenna device according to the first embodiment.

As shown in FIG. 14, the radiation field of the antenna device 110 is taken to be an elliptically polarized wave EP1. The desired polarization plane PP1 includes a major wavefront MP1. A cross-polarized wave CP1 crosses the direction of the elliptically polarized wave EP1. The polarization angle $\tau$ corresponds to the angle between "$a_\theta$" and the major axis of the elliptically polarized wave EP1 when the radiation field is considered to be the elliptically polarized wave EP1.

For example, there are cases where fluctuation exists in the radiation field. For example, fluctuation occurs when the cross-polarized wave of the multiple antenna elements is large. For example, fluctuation occurs in the radiation field due to manufacturing error. For example, fluctuation occurs in the radiation field due to characteristic fluctuation of the multiple phase shifters, etc. In such a case, for example, the polarization angle $\tau$ is no longer rotated 45° when the phases of the left-handed circularly polarized waves and the right-handed circularly polarized waves are changed relatively 90°. The difference between the polarization angle $\tau$ and a desired polarization angle to is increased. The cross-polarized wave with respect to the desired polarization plane increases. For example, the cross-polarized wave also is increased by lengthening the minor axis of the elliptically polarized wave EP1.

An example of excitation coefficients that reduce the cross-polarized wave with respect to the desired polarization plane PP1 while performing beam scanning will now be described.

The feed points 11*a*A, 11*b*A, 11*c*A, and 11*d*A are respectively excited by the excitation coefficients $c_{L1}$, $c_{L2}$, $c_{L3}$, and $c_{L4}$. At this time, the radiation field in the desired beam pointing direction ($\theta_0$, $\phi_0$) is given by the following ninth formula.

$$E_L = E_{L,\theta}a_\theta + E_{L,\phi}a_\phi = c_{L1}E_{L1} + c_{L2}E_{L2} + c_{L3}E_{L3} + c_{L4}E_{L4} \tag{9}$$

"$E_{L,\theta}$" and "$E_{L,\phi}$" are respectively the $\theta$-component and the $\phi$-component of "$E_L$" in the ninth formula.

The feed points 11*a*B, 11*b*B, 11*c*B, and 11*d*B are respectively excited by the excitation coefficients $c_{R1}$, $c_{R2}$, $c_{R3}$, and $c_{R4}$. At this time, the radiation field in the desired beam pointing direction ($\theta_0$, $\phi_0$) is given by the following tenth formula.

$$E_R=E_{R,\theta}a_\theta+E_{R,\phi}a_\phi=c_{R1}E_{R1}+c_{R2}E_{R2}+c_{R3}E_{R3}+c_{R4}E_{R4} \tag{10}$$

"$E_{R,\theta}$" and "$E_{R,\phi}$" are respectively the $\theta$-component and the $\phi$-component of "$E_R$" in the tenth formula.

When the excitations related to the feed points 11*a*A, 11*b*A, 11*c*A, and 11*d*A and the excitations related to the feed points 11*a*B, 11*b*B, 11*c*B, and 11*d*B are simultaneously performed, the radiation field in the desired beam pointing direction ($\theta_0$, $\phi_0$) is given by the following eleventh formula.

$$E = E_L + c_R E_R \tag{11}$$

A cross-polarized wave component $E_{crs}$ of "E" is represented by the following twelfth formula.

$$E_{crs} = (-\sin\,\tau_0 a_\theta + \cos\,\tau_0 a_\phi)\cdot E = -E_{L,\theta}\,\sin\,\tau_0 + E_{L,\phi}\,\cos\,\tau_0 + c_R(-E_{R,\theta}\,\sin\,\tau_0 + E_{R,\phi}\,\cos\,\tau_0) \tag{12}$$

The cross-polarized wave component $E_{crs}$ is taken to be 0. Accordingly, the excitation coefficient $c_R$ used to set the cross-polarized wave component $E_{crs}$ to zero is given by the following thirteenth formula.

$$c_R = -\frac{E_{L,\phi}\cos\tau_0 - E_{L,\theta}\sin\tau_0}{E_{R,\phi}\cos\tau_0 - E_{R,\theta}\sin\tau_0} \quad (13)$$

Thus, by simultaneously performing the excitations related to the feed points 11$a$A, 11$b$A, 11$c$A, and 11$d$A and the excitations related to the feed points 11$a$B, 11$b$B, 11$c$B, and 11$d$B, the cross-polarized wave CP1 with respect to the polarization plane PP1 at the desired polarization angle $\tau_0$ can be reduced while performing the beam pointing in the desired major beam direction ($\theta_0$, $\phi_0$).

Figure 15:
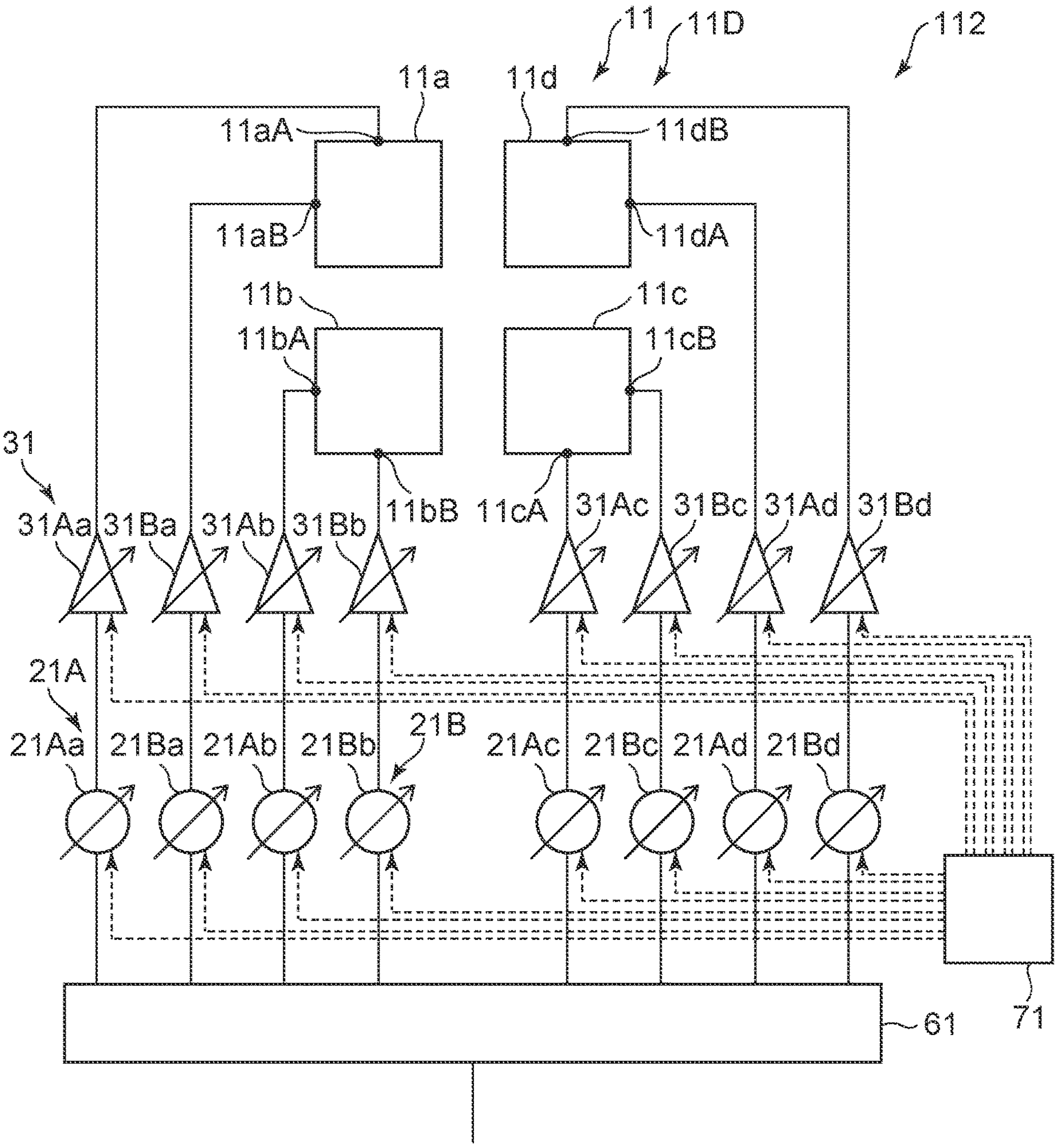
FIG. 15 is a schematic view illustrating an antenna device according to the first embodiment.

FIG. 15 is a schematic view illustrating an antenna device according to the first embodiment.

As shown in FIG. 15, the antenna device 112 according to the embodiment includes a first amplitude adjustment circuit 31. Otherwise, the configuration of the antenna device 112 may be similar to the configuration of the antenna device 110 or the antenna device 111.

The first amplitude adjustment circuit 31 is couplable with at least one of the multiple first phase shifters for left-handed circular polarized wave 21A and at least one of the multiple first phase shifters for right-handed circular polarized wave 21B. For example, the first amplitude adjustment circuit 31 may be electrically connected with the multiple first phase shifters for left-handed circular polarized wave 21A and the multiple first phase shifters for right-handed circular polarized wave 21B. The first control circuit 71 is configured to control the first amplitude adjustment circuit 31 based on the transmitted electromagnetic field radiated along the transmitting direction.

The first amplitude adjustment circuit 31 is configured to adjust the amplitude of at least one of the multiple first phase shifters for left-handed circular polarized wave 21A and at least one of the multiple first phase shifters for right-handed circular polarized wave 21B. For example, the antenna device 112 transmits a linearly polarized wave by synthesizing-left-handed circularly polarized waves and right-handed circularly polarized waves. In such a case, the first amplitude adjustment circuit 31 controls the amplitudes of the excitation coefficients of the antenna elements. The cross-polarized wave CP1 with respect to the desired polarization plane PP1 can be reduced thereby.

The first amplitude adjustment circuit 31 includes, for example, adjustment circuits 31Aa, 31Ab, 31Ac, 31Ad, 31Ba, 31Bb, 31Bc, and 31Bd.

The adjustment circuits 31Aa, 31Ab, 31Ac, and 31Ad are coupled respectively with the phase shifters 21Aa, 21Ab, 21Ac, and 21Ad. The adjustment circuits 31Aa, 31Ab, 31Ac, and 31Ad change the amplitudes of the left-handed circularly polarized signals. The left-handed circularly polarized signals having changed amplitudes are supplied respectively to the feed points 11$a$A, 11$b$A, 11$c$A, and 11$d$A.

The adjustment circuits 31Ba, 31Bb, 31Bc, and 31Bd are coupled respectively with the phase shifters 21Ba, 21Bb, 21Bc, and 21Bd. The adjustment circuits 31Ba, 31Bb, 31Bc, and 31Bd change the amplitudes of the right-handed circularly polarized signals. The right-handed circularly polarized signals having the changed amplitudes are supplied respectively to the feed points 11$a$B, 11$b$B, 11$c$B, and 11$d$B.

According to the embodiment, the first amplitude adjustment circuit 31 may be connected between the first power divider 61 and the multiple phase shifters.

The first amplitude adjustment circuit 31 may include, for example, a variable attenuator, a variable gain amplifier, etc. The first amplitude adjustment circuit 31 may change the amplitude of the high-frequency signal continuously or discretely. The configurations of the multiple adjustment circuits included in the first amplitude adjustment circuit 31 may be the same or may be different from each other. The first amplitude adjustment circuit 31 may include a power amplifier.

The amplitudes of the excitation coefficients can be controlled by the first amplitude adjustment circuit 31. For example, the cross-polarized wave CP1 with respect to the desired polarization plane PP1 can be reduced when performing beam scanning of the linearly polarized wave formed by synthesizing-left-handed circularly polarized waves and right-handed circularly polarized waves.

Figure 16:
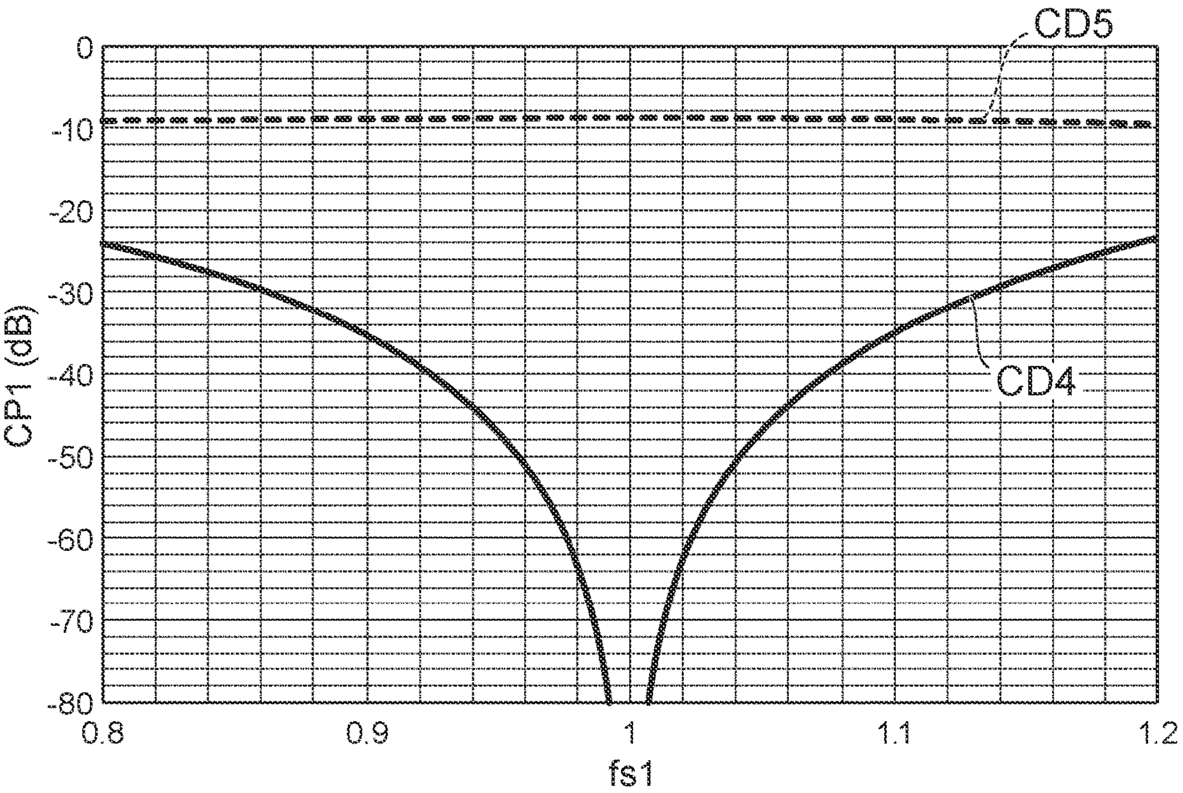
FIG. 16 is a graph illustrating characteristics of the antenna device.

FIG. 16 is a graph illustrating characteristics of the antenna device.

FIG. 16 illustrates the frequency characteristics of the cross-polarized wave CP1 in the desired major beam direction ($\theta_0$, $\phi_0$) when the feed points 11$a$A, 11$b$A, 11$c$A, and 11$d$A are excited by the excitation coefficients $c_{L1}$, $c_{L2}$, $c_{L3}$, and $c_{L4}$ and the feed points 11$a$B, 11$b$B, 11$c$B, and 11$d$B are excited by the excitation coefficients $c_{R1}$, $c_{R2}$, $c_{R3}$, and $c_{R4}$ for the configuration illustrated in FIG. 6. In the example, ($\theta_0$, $\phi_0$) is (30°, 45°). The polarization angle $\tau_0$ is 60°. In the example, the excitation coefficients are set based on the second to fourth formulas and the sixth to eighth formulas.

FIG. 16 illustrates characteristics using a fourth condition CD4 and a fifth condition CD5. In the fourth condition CD4, the excitation coefficient $c_R$ used to set the cross-polarized wave component $E_{crs}$ to zero is based on the thirteenth formula. The amplitude of the excitation coefficient changes based on the thirteenth formula. In the fifth condition CD5, $|c_R|$ is set to 1, and the phase of the excitation coefficient $c_R$ is determined to minimize the cross-polarized wave CP1.

Figure 17A:
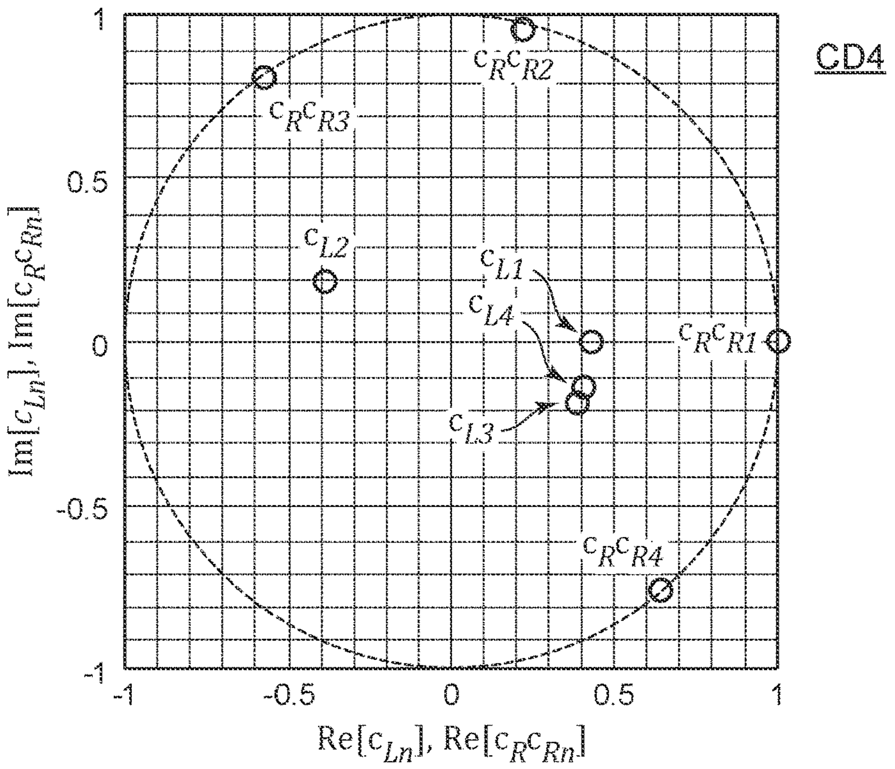
FIGS. 17A and 17B are schematic views illustrating characteristics of the antenna device.
Figure 17B:
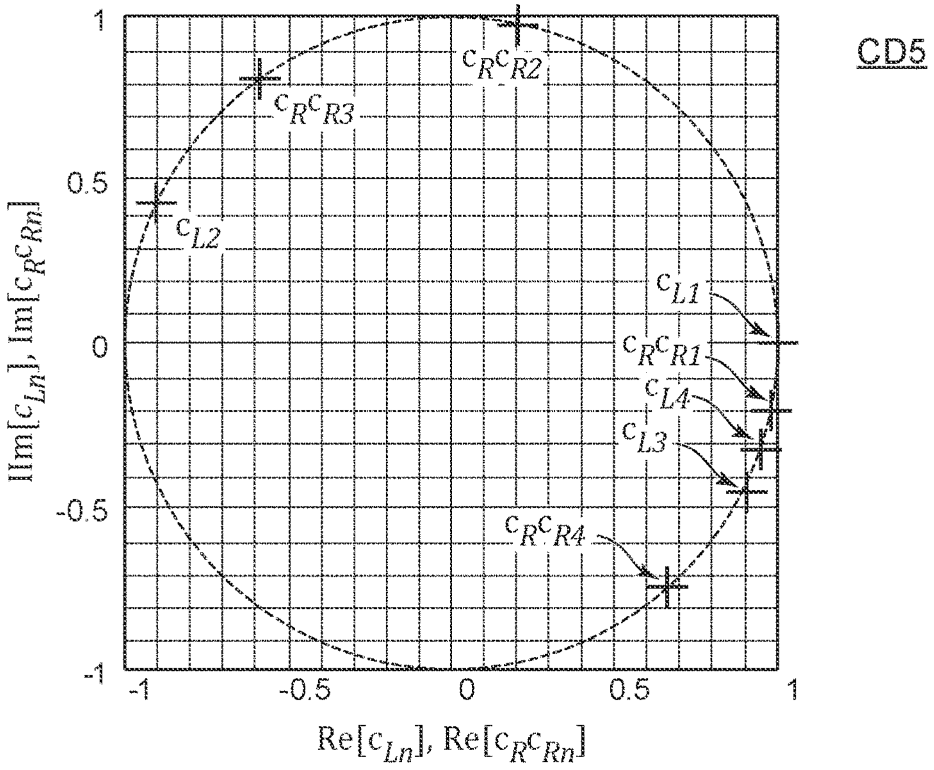

FIGS. 17A and 17B are schematic views illustrating characteristics of the antenna device.

FIG. 17A corresponds to the fourth condition CD4. FIG. 17B corresponds to the fifth condition CD5. In these figures, the excitation coefficients are normalized so that the maximum value of the excitation coefficients is 1.

In the fifth condition CD5 as shown in FIG. 17B, the eight feed points of the four antenna elements all are excited with the same amplitude.

In FIG. 17A, in the fourth condition CD4 to which the thirteenth formula is applied, the cross-polarized wave CP1 at the center frequency is not more than −80 dB. In contrast, in the fifth condition CD5, the cross-polarized wave at the center frequency is large, i.e., −8.7 dB.

By providing the first amplitude adjustment circuit 31, the amplitudes of the excitation coefficients can be controlled. The cross-polarized wave CP1 can be reduced thereby.

According to the embodiment, the excitation coefficient $c_R$ used to set the cross-polarized wave component $E_{crs}$ to zero may not be exactly equal to the value based on the thirteenth formula. The excitation coefficient $c_R$ may be substantially equal to the value based on the thirteenth formula. The cross-polarized wave CP1 can be sufficiently reduced thereby.

According to the embodiment, the excitation coefficient $c_R$ for radiating the linearly polarized wave in directions near the desired beam pointing direction ($\theta_0$, $\phi_0$) may be obtained by interpolation. The excitation coefficient $c_R$ for radiating the linearly polarized wave in the desired beam pointing direction ($\theta_0$, $\phi_0$) may be determined based on the interpolated values.

Figure 18:
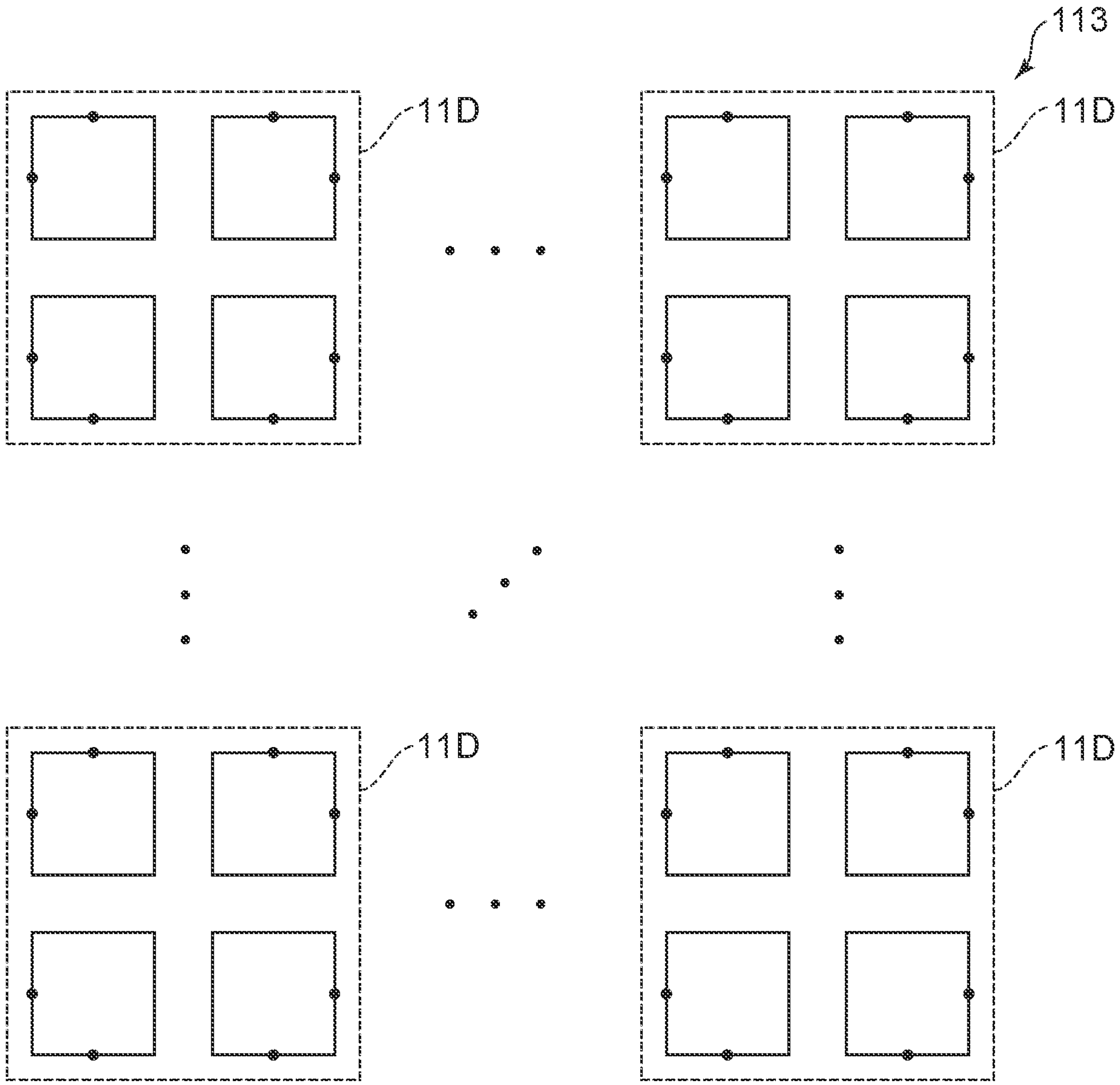
FIG. 18 is a schematic view illustrating an antenna device according to the first embodiment.

FIG. 18 is a schematic view illustrating an antenna device according to the first embodiment.

As shown in FIG. 18, the antenna device 113 according to the embodiment includes multiple first antenna parts 11D. Otherwise, the configuration of the antenna device 113 may be similar to the configurations of the antenna devices 110 to 112. For example, the gain is improved by arraying the antenna elements. For example, the antenna device 113 can be used for long-distance wireless communication.

Second Embodiment

Figure 19:
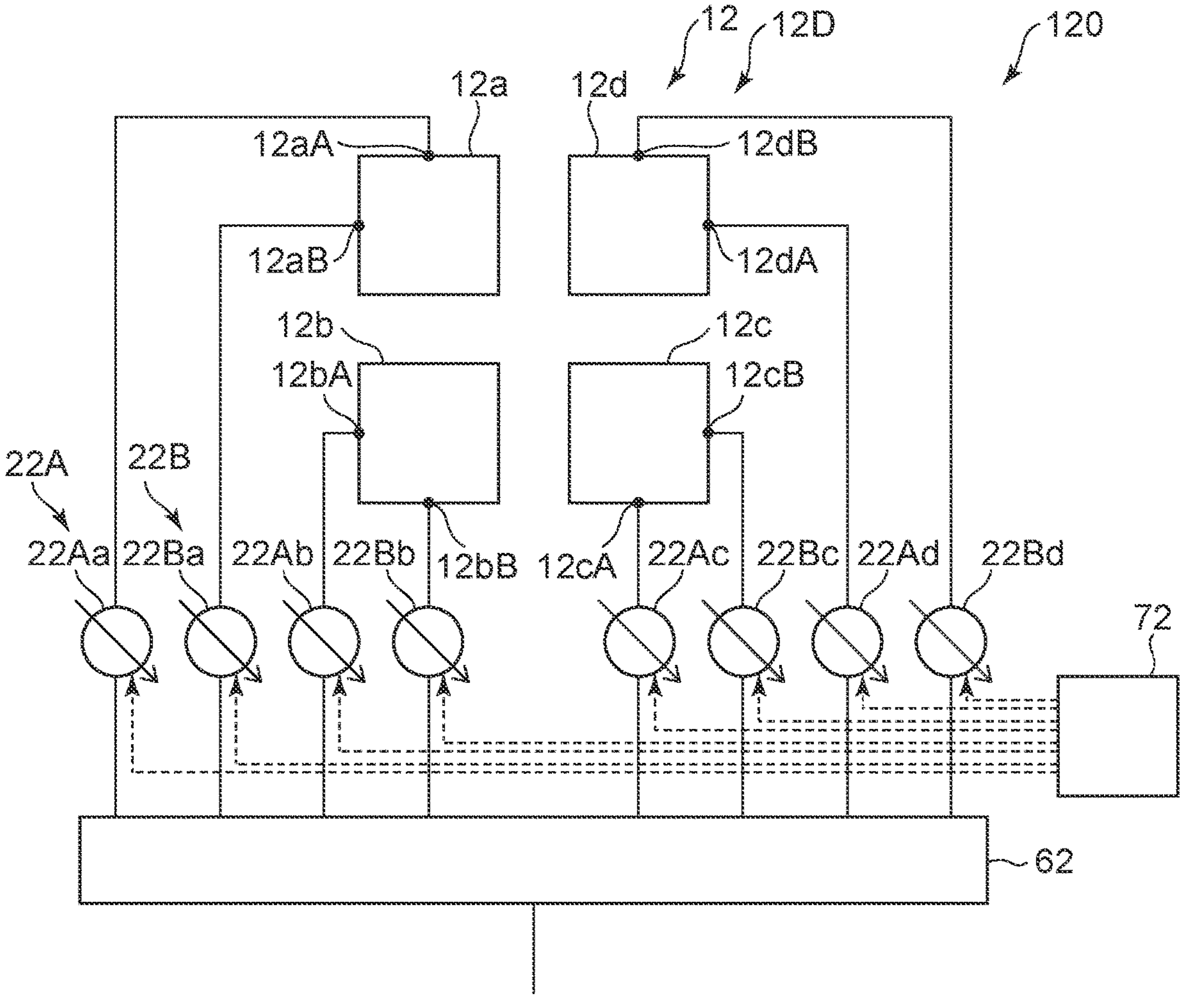
FIG. 19 is a schematic view illustrating an antenna device according to a second embodiment.

FIG. 19 is a schematic view illustrating an antenna device according to a second embodiment.

As shown in FIG. 19, the antenna device 120 according to the embodiment includes a second antenna part 12D, a second power divider 62, and a second control circuit 72.

The second antenna part 12D includes multiple second antenna elements 12, multiple second phase shifters for left-handed circular polarized wave 22A, and multiple second phase shifters for right-handed circular polarized wave 22B.

The multiple second antenna elements 12 include, for example, an antenna element 12*a*, an antenna element 12*b*, an antenna element 12*c*, an antenna element 12*d*, etc. The number of the multiple second antenna elements 12 is arbitrary.

The multiple second antenna elements 12 are configured to perform a first receiving operation and a second receiving operation. These operations may be performed separately by the multiple second antenna elements 12. These operations may be simultaneously performed by the multiple second antenna elements 12.

In the first receiving operation, the multiple second antenna elements 12 receive a receiving-left-handed circularly polarized wave. In the second receiving operation, the multiple second antenna elements 12 receive a receiving-right-handed circularly polarized wave.

The multiple second phase shifters for left-handed circular polarized wave 22A include, for example, a phase shifter 22Aa, a phase shifter 22Ab, a phase shifter 22Ac, a phase shifter 22Ad, etc. The number of the multiple second phase shifters for left-handed circular polarized wave 22A is arbitrary. One of the multiple second phase shifters for left-handed circular polarized wave 22A is configured to change the phase of the receiving-left-handed circularly polarized wave of one of the multiple second antenna elements 12. For example, the multiple second phase shifters for left-handed circular polarized wave 22A are configured to respectively change the phases of the receiving-left-handed circularly polarized waves of the multiple second antenna elements 12.

The multiple second phase shifters for right-handed circular polarized wave 22B include, for example, a phase shifter 22Ba, a phase shifter 22Bb, a phase shifter 22Bc, a phase shifter 22Bd, etc. The number of the multiple second phase shifters for right-handed circular polarized wave 22B is arbitrary. One of the multiple second phase shifters for right-handed circular polarized wave 22B is configured to change the phase of the receiving-right-handed circularly polarized wave of one of the multiple second antenna elements 12. For example, the multiple second phase shifters for right-handed circular polarized wave 22B are configured to respectively change the phases of the receiving-right-handed circularly polarized waves of the multiple second antenna elements 12.

The second power divider 62 is couplable with the multiple second phase shifters for left-handed circular polarized wave 22A and the multiple second phase shifters for right-handed circular polarized wave 22B. For example, the second power divider 62 is electrically connected with the multiple second phase shifters for left-handed circular polarized wave 22A and the multiple second phase shifters for right-handed circular polarized wave 22B.

The orientation (e.g., the angle) of one of the multiple second antenna elements 12 is different from the orientation (e.g., the angle) of another one of the multiple second antenna elements 12. For example, the multiple second antenna elements 12 are provided to be rotated at mutually-different orientations.

The second control circuit 72 is configured to control the phase shift amounts of the multiple second phase shifters for left-handed circular polarized wave 22A so that multiple receiving-left-handed circularly polarized waves corresponding to the multiple second antenna elements 12 are synthesized to be substantially in-phase in a receiving direction of a received electromagnetic wave including a receiving-left-handed circularly polarized wave and a receiving-right-handed circularly polarized wave.

The second control circuit 72 is configured to control the phase shift amounts of the multiple second phase shifters for right-handed circular polarized wave 22B so that multiple receiving-right-handed circularly polarized waves corresponding to the multiple second antenna elements 12 are synthesized to be substantially in-phase in the receiving direction.

Thus, according to the embodiment, the phase shifters are controlled so that the circularly polarized waves received by the multiple second antenna elements 12 are synthesized to be in-phase. Good circularly polarized wave characteristics are obtained thereby, even when, for example, there exist manufacturing error of the multiple second antenna elements 12, mutual coupling between elements of the multiple second antenna elements 12, characteristic fluctuation of the phase shifters, etc. According to the embodiment, an antenna device can be provided in which the characteristics can be improved.

The configurations described above with reference to the multiple first antenna elements 11 are applicable to the multiple second antenna elements 12.

As shown in FIG. 19, the antenna element 12*a* includes a feed point 12*a*A and a feed point 12*a*B. The antenna element 12*b* includes a feed point 12*b*A and a feed point 12*b*B. The antenna element 12*c* includes a feed point 12*c*A and a feed point 12*c*B. The antenna element 12*d* includes a feed point 12*d*A and a feed point 12*d*B.

For example, the phase shifter 22Aa is coupled (connected) with the feed point 12*a*A. The phase shifter 22Ab is coupled (connected) with the feed point 12*b*A. The phase shifter 22Ac is coupled (connected) with the feed point 12*c*A. The phase shifter 22Ad is coupled (connected) with the feed point 12*d*A.

For example, the phase shifter 22Ba is coupled (connected) with the feed point 12*a*B. The phase shifter 22Bb is coupled (connected) with the feed point 12*b*B. The phase shifter 22Bc is coupled (connected) with the feed point 12*c*B. The phase shifter 22Bd is coupled (connected) with the feed point 12*d*B.

For example, the number of the multiple second antenna elements 12 is "M". "M" is an integer not less than 2. The multiple second antenna elements 12 include an mth second antenna element. "m" is an integer not less than 1 and not more than "M". The rotation angle of the mth second antenna element is, for example, 180°×k×m/M. "k" is an integer not less than 1. For example, the receiving characteristics of circularly polarized waves are improved by axial symmetry of the antenna elements.

When the number of the multiple second antenna elements 12 is "M", the number of the multiple second phase shifters for left-handed circular polarized wave 22A may be "M". When the number of the multiple second antenna elements 12 is "M", the number of the multiple second phase shifters for right-handed circular polarized wave 22B may be "M".

According to the embodiment, the multiple second antenna elements 12 are configured to receive a linearly polarized wave. For example, the second control circuit 72 is configured to change the relative phase shift amount of at least one of the multiple second phase shifters for left-handed circular polarized wave 22A and at least one of the multiple second phase shifters for right-handed circular polarized wave 22B based on the linearly polarized wave received by the multiple second antenna elements 12. Accordingly, the antenna device 120 can receive a linearly polarized wave at any polarization angle.

Figure 20:
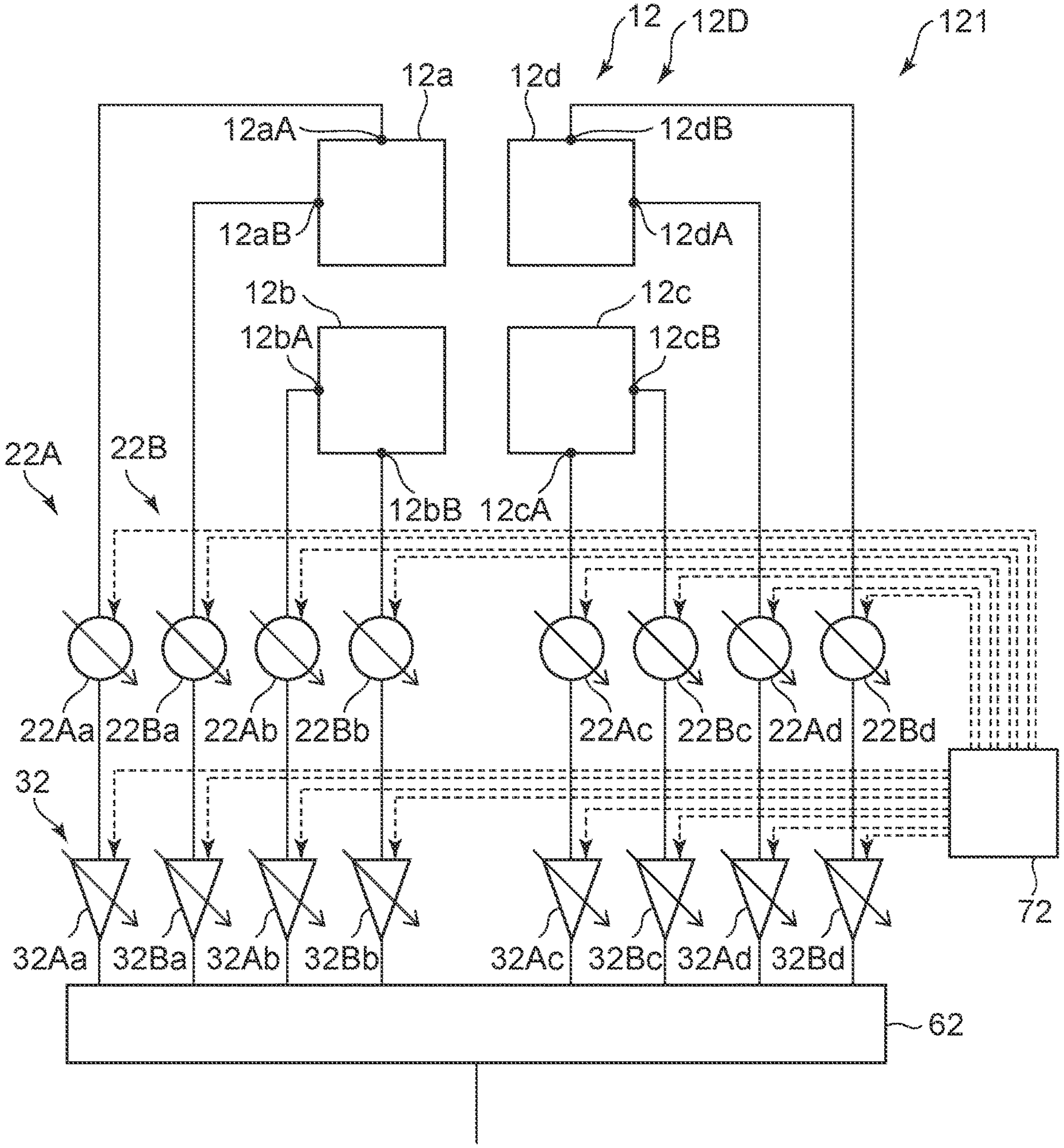
FIG. 20 is a schematic view illustrating an antenna device according to the second embodiment.

FIG. 20 is a schematic view illustrating an antenna device according to the second embodiment.

As shown in FIG. 20, the antenna device 121 according to the embodiment further includes a second amplitude adjustment circuit 32. Otherwise, the configuration of the antenna device 121 may be similar to the configuration of the antenna device 120.

The second amplitude adjustment circuit 32 is couplable with at least one of the multiple second phase shifters for left-handed circular polarized wave 22A and at least one of the multiple second phase shifters for right-handed circular polarized wave 22B. The second amplitude adjustment circuit 32 may be electrically connected with the multiple second phase shifters for left-handed circular polarized wave 22A and the multiple second phase shifters for right-handed circular polarized wave 22B.

The second control circuit 72 is configured to control the second amplitude adjustment circuit 32 based on the received electromagnetic wave.

For example, the antenna device 121 receives a linearly polarized wave. At this time, the second control circuit 72 can control the amplitudes of the excitation coefficients of the multiple second antenna elements 12 by controlling the second amplitude adjustment circuit 32. For example, the received signal intensity is increased thereby.

The second amplitude adjustment circuit 32 includes, for example, adjustment circuits 32Aa, 32Ab, 32Ac, 32Ad, 32Ba, 32Bb, 32Bc, and 32Bd.

The adjustment circuits 32Aa, 32Ab, 32Ac, and 32Ad are coupled respectively to the phase shifters 22Aa, 22Ab, 22Ac, and 22Ad. The adjustment circuits 32Aa, 32Ab, 32Ac, and 32Ad change the amplitudes of the left-handed circularly polarized signals. The left-handed circularly polarized signals having the changed amplitudes are supplied to the second power divider 62.

The adjustment circuits 32Ba, 32Bb, 32Bc, and 32Bd are coupled respectively to the phase shifters 22Ba, 22Bb, 22Bc, and 22Bd. The adjustment circuits 32Ba, 32Bb, 32Bc, and 32Bd changes the amplitudes of the right-handed circularly polarized signals. The right-handed circularly polarized signals having the changed amplitudes are supplied to the second power divider 62.

For example, the amplitudes and phases of the left-handed circularly polarized signals and right-handed circularly polarized signals can be changed. The received signal intensity when using a linearly polarized wave to perform wireless communication can be increased thereby. The communication quality is improved. A divider for the left-handed circularly polarized signals and a divider for the right-handed circularly polarized signals may be included in the antenna device 121.

Figure 21:
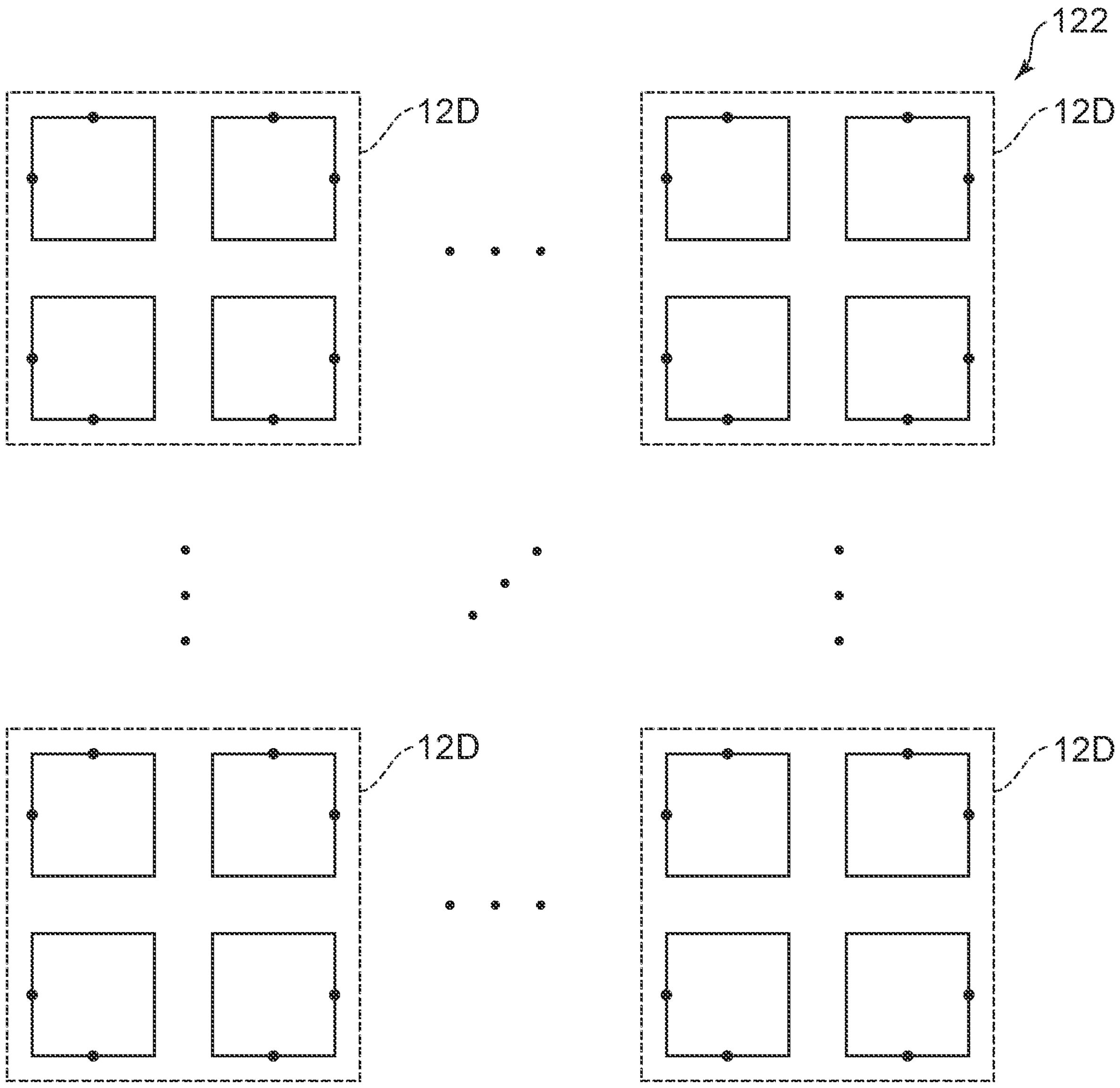
FIG. 21 is a schematic view illustrating an antenna device according to the second embodiment.

FIG. 21 is a schematic view illustrating an antenna device according to the second embodiment.

As shown in FIG. 21, the antenna device 122 according to the embodiment includes multiple second antenna parts 12D. Otherwise, the configuration of the antenna device 122 may be similar to the configuration of the antenna device 120 or the antenna device 121. For example, the gain is improved by arraying receiving antennas. For example, the antenna device 122 can be used for long-distance wireless communication.

Third Embodiment

Figure 22:
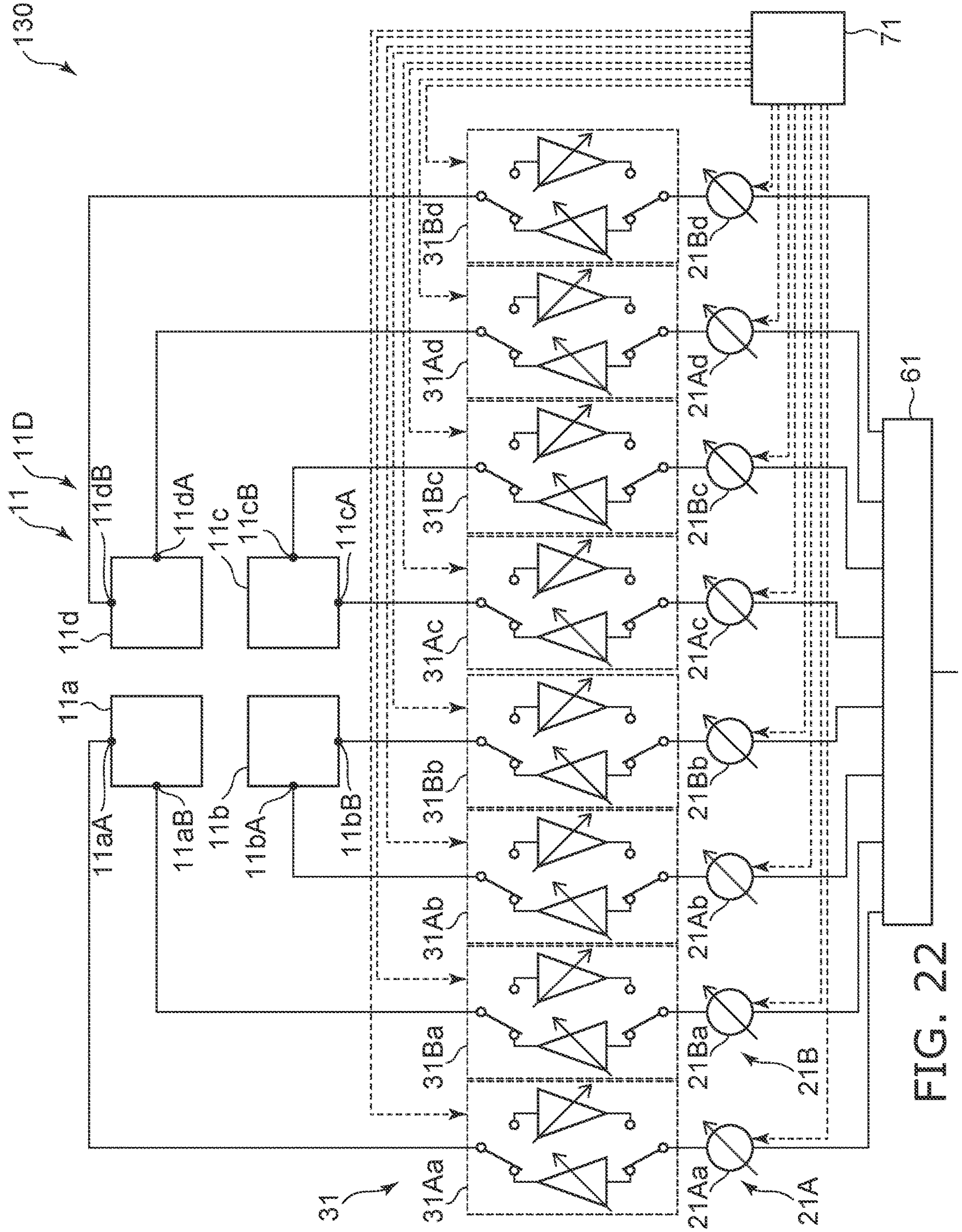
FIG. 22 is a schematic view illustrating an antenna device according to a third embodiment.

FIG. 22 is a schematic view illustrating an antenna device according to a third embodiment.

As shown in FIG. 22, the antenna device 130 according to the embodiment includes the first antenna part 11D, the first power divider 61, and the first control circuit 71. The first antenna part 11D is configured to transmit and receive. The first power divider 61 is configured to perform an operation relating to transmitting (the first embodiment) and an operation related to receiving (the second embodiment). The first control circuit 71 is configured to perform an operation related to transmitting (the first embodiment) and an operation related to receiving (the second embodiment).

In the example, the antenna device 130 includes the first amplitude adjustment circuit 31. The first amplitude adjustment circuit 31 is configured to perform an operation related to transmitting (the first embodiment) and an operation related to receiving (the second embodiment). For example, these operations can be switched by a switch circuit. The switching may be performed by a circulator. For example, the device can be small because the first antenna part 11D can perform transmitting and receiving.

Figure 23:
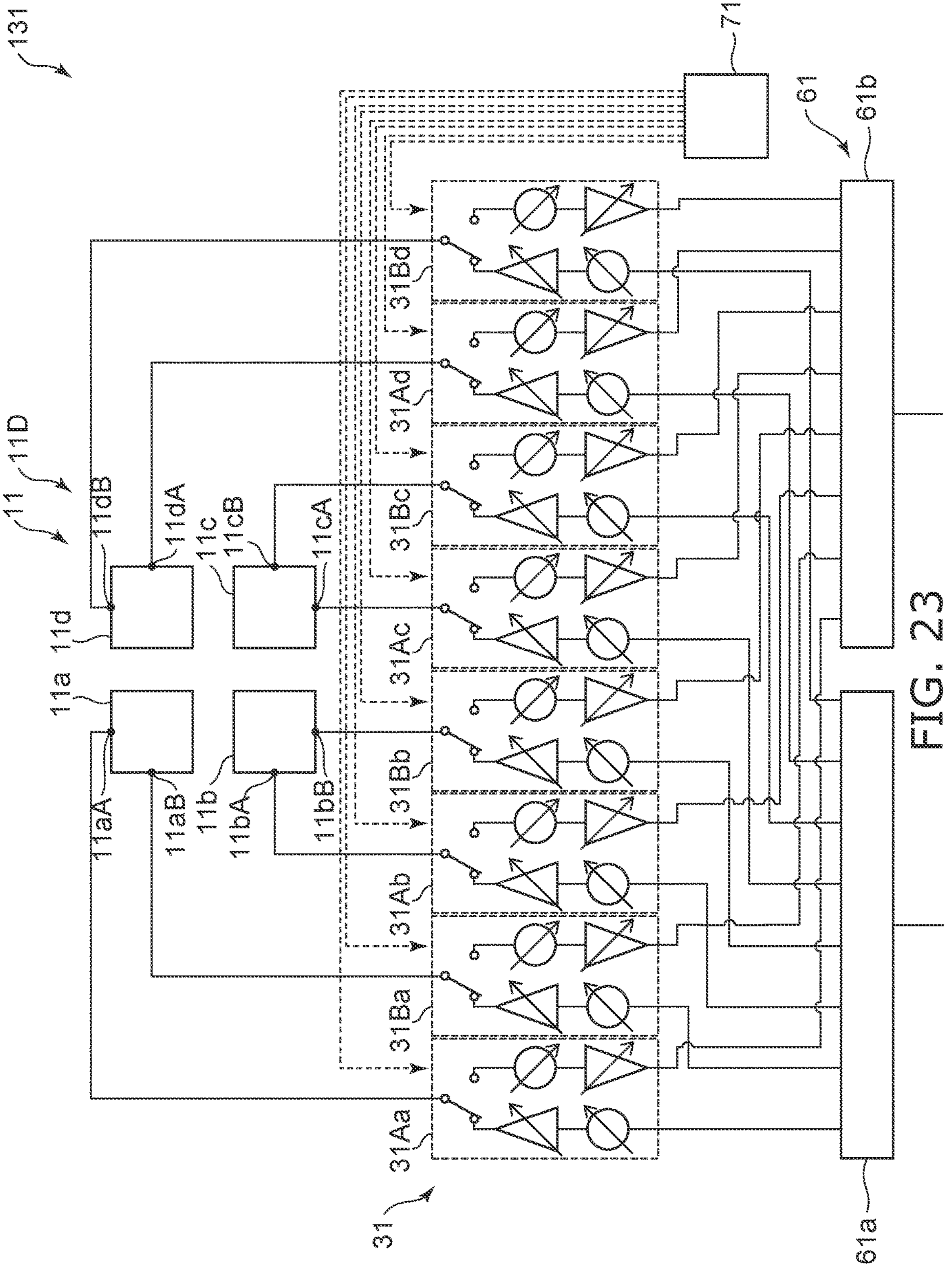
FIG. 23 is a schematic view illustrating an antenna device according to the third embodiment.

FIG. 23 is a schematic view illustrating an antenna device according to the third embodiment.

In the antenna device 131 according to the embodiment as shown in FIG. 23, the first power divider 61 includes the dividers 61*a* and 61*b*. The divider 61*a* performs division related to the left-handed circularly polarized signals. The divider 61*b* performs division related to the right-handed circularly polarized signals.

Figure 24A:
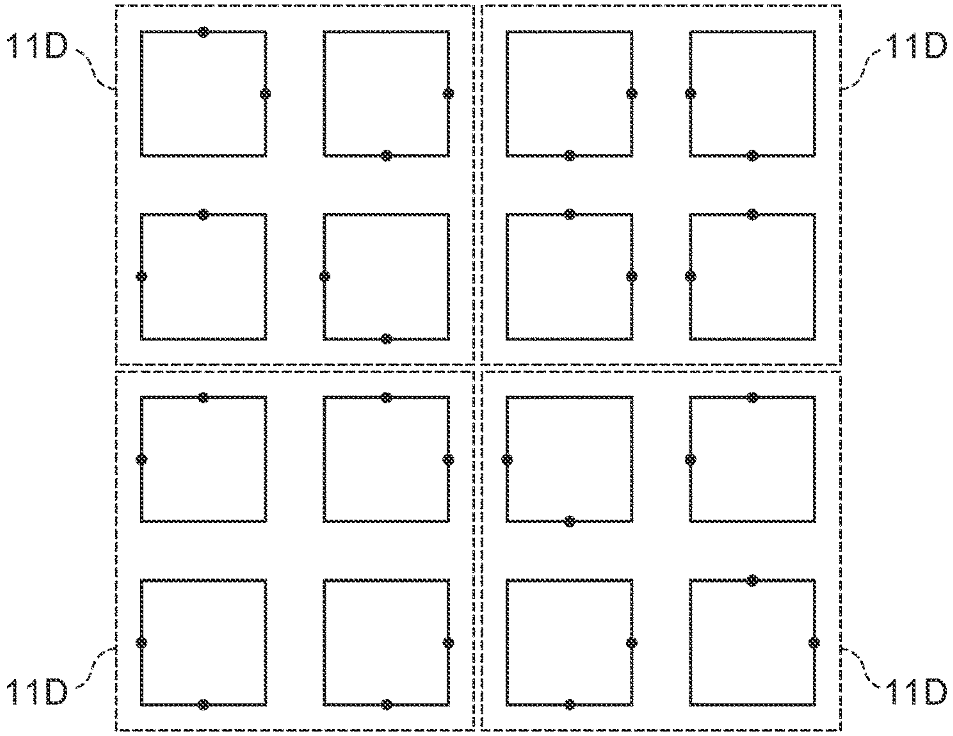
FIGS. 24A and 24B are schematic views illustrating an antenna device according to the embodiment.
Figure 24B:
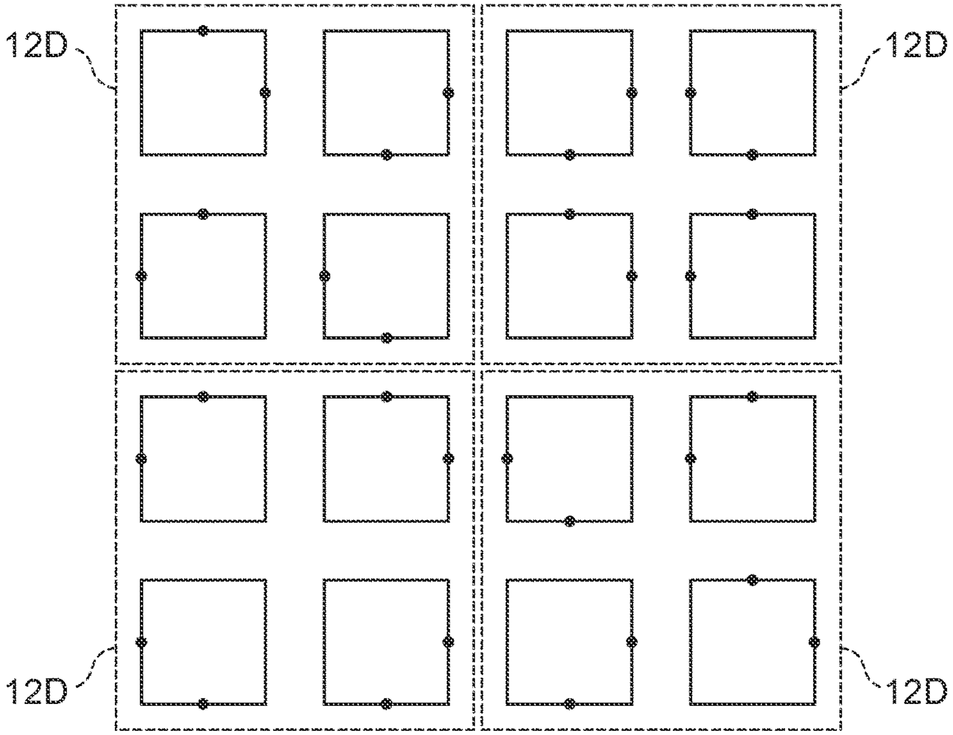

FIGS. 24A and 24B are schematic views illustrating an antenna device according to the embodiment.

The multiple first antenna parts 11D may be provided to be rotated as shown in FIG. 24A. The multiple second antenna parts 12D may be provided to be rotated as shown in FIG. 24B. Better circularly polarized radiation characteristics are obtained.

Fourth Embodiment

Figure 25:
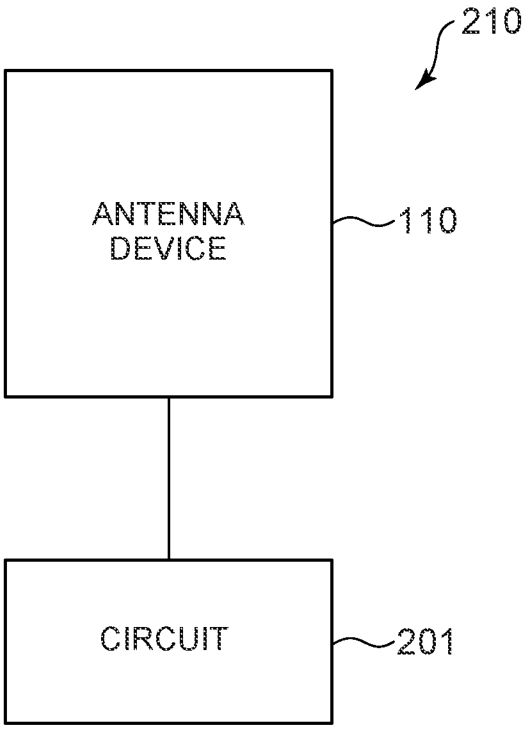
FIG. 25 is a schematic view illustrating an antenna device according to a fourth embodiment.

FIG. 25 is a schematic view illustrating an antenna device according to a fourth embodiment.

As shown in FIG. 25, a wireless device 210 according to the embodiment includes an electrical circuit 201 and the antenna device (e.g., the antenna device 110) according to any of the first to third embodiments. The electrical circuit

201 is couplable with the antenna device (e.g., the antenna device 110). For example, the electrical circuit 201 may be couplable with the antenna devices 110 and 120. For example, the electrical circuit 201 may be couplable with the antenna device 130. By providing the electrical circuit 201, wireless communication is possible.

The electrical circuit 201 may be, for example, a wireless circuit. For example, the electrical circuit 201 generates a high-frequency signal, supplies the high-frequency signal to the antenna device, and causes radiation of a circularly polarized wave or a linearly polarized wave. When the antenna device receives a circularly polarized wave or a linearly polarized wave, the electrical circuit 201 demodulates the high-frequency signal output by the antenna device. For example, the wireless device 210 can be used as a wireless communication device or radar.

For example, the embodiment is applicable to a wireless communication device, radar, or the like that uses a phased array. For example, the embodiment is applicable to a sequential array in which the dual-circularly polarized antenna elements are sequentially rotated. For example, the radiation characteristics of the circularly polarized wave are improved. For example, the excitation phases are controlled so that the radiation fields of the multiple antenna elements are in-phase in the desired beam pointing direction. Good circularly polarized radiation characteristics are obtained thereby, even when manufacturing error or characteristic fluctuation of the phase shifters exist.

A linearly polarized wave of any polarization angle also can be generated by simultaneously radiating the left-handed circularly polarized waves and the right-handed circularly polarized waves while performing beam scanning. For example, the polarization angle is controlled mainly based on the relative phases between the left-handed circularly polarized waves and the right-handed circularly polarized waves. Accordingly, the transmission power can be greater than when the polarization angle is controlled by changing the amplitude ratio of two orthogonal linearly polarized waves. By controlling the amplitudes and phases of the excitation coefficients based on the radiation fields of the multiple antenna elements, the cross-polarized wave can be reduced.

Embodiments may include the following configurations (e.g., technological proposals).

Configuration 1

An antenna device, comprising:

a first antenna part including a plurality of first antenna elements configured to perform a first transmitting operation of transmitting a transmitting-left-handed circularly polarized wave, and a second transmitting operation of transmitting a transmitting-right-handed circularly polarized wave, a plurality of first phase shifters for left-handed circular polarized wave, one of the plurality of first phase shifters for left-handed circular polarized wave being configured to change a phase of the transmitting-left-handed circularly polarized wave of one of the plurality of first antenna elements, and a plurality of first phase shifters for right-handed circular polarized wave, one of the plurality of first phase shifters for right-handed circular polarized wave being configured to change a phase of the transmitting-right-handed circularly polarized wave of the one of the plurality of first antenna elements;

a first power divider couplable with the plurality of first phase shifters for left-handed circular polarized wave and the plurality of first phase shifters for right-handed circular polarized wave; and a first control circuit, an orientation of the one of the plurality of first antenna elements being different from an orientation of an other one of the plurality of first antenna elements, the first control circuit being configured to control phase shift amounts of the plurality of first phase shifters for left-handed circular polarized wave so that a plurality of the transmitting-left-handed circularly polarized waves corresponding to the plurality of first antenna elements is substantially in-phase in a transmitting direction of a transmitted electromagnetic wave, the transmitted electromagnetic wave including the transmitting-left-handed circularly polarized waves and the transmitting-right-handed circularly polarized waves, the first control circuit being configured to control phase shift amounts of the plurality of first phase shifters for right-handed circular polarized wave so that a plurality of the transmitting-right-handed circularly polarized waves corresponding to the plurality of first antenna elements is substantially in-phase in the transmitting direction.

Configuration 2

The antenna device according to Configuration 1, wherein a number of the plurality of first antenna elements is N, N is an integer not less than 2, the plurality of first antenna elements includes an nth first antenna element, n is an integer not less than 1 and not more than N, a rotation angle of the nth first antenna element is $180° \times i \times n/N$, and i is an integer not less than 1.

Configuration 3

The antenna device according to Configuration 1, wherein the plurality of first antenna elements each are configured to generate a transmitted linearly polarized wave by simultaneously radiating the transmitting-left-handed circularly polarized wave and the transmitting-right-handed circularly polarized wave, and the first control circuit is configured to change a relative phase shift amount between at least one of the plurality of first phase shifters for left-handed circular polarized wave and at least one of the plurality of first phase shifters for right-handed circular polarized wave based on the transmitted linearly polarized waves radiated by the plurality of first antenna elements.

Configuration 4

The antenna device according to Configuration 1, further comprising:

a first amplitude adjustment circuit, the first amplitude adjustment circuit being couplable with at least one of the plurality of first phase shifters for left-handed circular polarized wave and at least one of the plurality of first phase shifters for right-handed circular polarized wave, the first control circuit being configured to control the first amplitude adjustment circuit based on a transmitted electromagnetic field radiated along the transmitting direction.

Configuration 5

The antenna device according to Configuration 1, comprising:

a plurality of the first antenna parts.

Configuration 6

The antenna device according to Configuration 1, wherein the plurality of first antenna elements each are provided to be rotated to mutually-different orientations.

Configuration 7

The antenna device according to Configuration 2, wherein
a number of the plurality of first phase shifters for left-handed circular polarized wave is N, and
a number of the plurality of first phase shifters for right-handed circular polarized wave is N.

Configuration 8

An antenna device, comprising:
a second antenna part including
a plurality of second antenna elements configured to perform a first receiving operation in which a receiving-left-handed circularly polarized wave is received, and a second receiving operation in which a receiving-right-handed circularly polarized wave is received,
a plurality of second phase shifters for left-handed circular polarized wave, one of the plurality of second phase shifters for left-handed circular polarized wave being configured to change a phase of the receiving-left-handed circularly polarized wave of one of the plurality of second antenna elements, and
a plurality of second phase shifters for right-handed circular polarized wave, one of the plurality of second phase shifters for right-handed circular polarized wave being configured to change a phase of the receiving-right-handed circularly polarized wave of the one of the plurality of second antenna elements;
a second power divider couplable with the plurality of second phase shifters for left-handed circular polarized wave and the plurality of second phase shifters for right-handed circular polarized wave; and
a second control circuit,
an orientation of the one of the plurality of second antenna elements being different from an orientation of the other one of the plurality of second antenna elements,
the second control circuit being configured to control phase shift amounts of the plurality of second phase shifters for left-handed circular polarized wave so that a plurality of the receiving-left-handed circularly polarized waves corresponding to the plurality of second antenna elements is synthesized to be substantially in-phase in a receiving direction of a received electromagnetic wave, the received electromagnetic wave including the receiving-left-handed circularly polarized waves and the receiving-right-handed circularly polarized waves,
the second control circuit being configured to control phase shift amounts of the plurality of second phase shifters for right-handed circular polarized wave so that a plurality of the receiving-right-handed circularly polarized waves corresponding to the plurality of second antenna elements is synthesized to be substantially in-phase in the receiving direction.

Configuration 9

The antenna device according to Configuration 8, wherein
a number of the plurality of second antenna elements is M,
M is an integer not less than 2,
the plurality of second antenna elements includes an mth second antenna element,
m is an integer not less than 1 and not more than M,
a rotation angle of the mth second antenna element is 180°×k×m/M, and
k is an integer not less than 1.

Configuration 10

The antenna device according to Configuration 8, wherein
the plurality of second antenna elements is configured to receive a linearly polarized wave, and
the second control circuit is configured to change a relative phase shift amount between at least one of the plurality of second phase shifters for left-handed circular polarized wave and at least one of the plurality of second phase shifters for right-handed circular polarized wave based on the linearly polarized wave received by the plurality of second antenna elements.

Configuration 11

The antenna device according to Configuration 8, further comprising:
a second amplitude adjustment circuit,
the second amplitude adjustment circuit being couplable with at least one of the plurality of second phase shifters for left-handed circular polarized wave and at least one of the plurality of second phase shifters for right-handed circular polarized wave,
the second control circuit being configured to control the second amplitude adjustment circuit based on the received electromagnetic wave.

Configuration 12

The antenna device according to Configuration 8, comprising:
a plurality of the second antenna parts.

Configuration 13

The antenna device according to Configuration 8, wherein the plurality of second antenna elements each are provided to be rotated to mutually-different orientations.

Configuration 14

The antenna device according to Configuration 9, wherein
a number of the plurality of second phase shifters for left-handed circular polarized wave is M, and
a number of the plurality of second phase shifters for right-handed circular polarized wave is M.

Configuration 15

A wireless device, comprising:
at least one of the antenna device according to Configuration 5 or the antenna device according to Configuration 12; and
an electrical circuit,
the electrical circuit being couplable with the at least one of the antenna device according to Configuration 5 or the antenna device according to Configuration 12.

According to embodiments, an antenna device and a wireless device can be provided in which characteristics can be improved.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in antenna devices such as antenna elements, power dividers, control circuits etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all antenna devices and wireless devices practicable by an appropriate design modification by one skilled in the art based on the antenna devices and the wireless devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An antenna device, comprising:

a first antenna part including a plurality of first antenna elements configured to perform a first transmitting operation of transmitting a transmitting-left-handed circularly polarized wave, and a second transmitting operation of transmitting a transmitting-right-handed circularly polarized wave, a plurality of first phase shifters for left-handed circular polarized wave, one of the plurality of first phase shifters for left-handed circular polarized wave being configured to change a phase of the transmitting-left-handed circularly polarized wave of one of the plurality of first antenna elements, and a plurality of first phase shifters for right-handed circular polarized wave, one of the plurality of first phase shifters for right-handed circular polarized wave being configured to change a phase of the transmitting-right-handed circularly polarized wave of the one of the plurality of first antenna elements;

a first power divider couplable with the plurality of first phase shifters for left-handed circular polarized wave and the plurality of first phase shifters for right-handed circular polarized wave; and a first control circuit, an orientation of the one of the plurality of first antenna elements being different from an orientation of an other one of the plurality of first antenna elements, the first control circuit being configured to control phase shift amounts of the plurality of first phase shifters for left-handed circular polarized wave so that a plurality of the transmitting-left-handed circularly polarized waves corresponding to the plurality of first antenna elements is substantially in-phase in a transmitting direction of a transmitted electromagnetic wave, the transmitted electromagnetic wave including the transmitting-left-handed circularly polarized waves and the transmitting-right-handed circularly polarized waves, the first control circuit being configured to control phase shift amounts of the plurality of first phase shifters for right-handed circular polarized wave so that a plurality of the transmitting-right-handed circularly polarized waves corresponding to the plurality of first antenna elements is substantially in-phase in the transmitting direction, the first control circuit being configured to control the phase shift amounts based on following first to eighth formulae:

$$E_{Li,L} = \frac{1}{\sqrt{2}}\left(a_\theta \rightarrow ja_\phi\right)\cdot E_{Li} \quad (1)$$

$$\arg(c_{L2}) = \arg\left(\frac{E_{L1,L}}{E_{L2,L}}c_{L1}\right) \quad (2)$$

$$\arg(c_{L3}) = \arg\left(\frac{E_{L1,L}}{E_{L3,L}}c_{L1}\right) \quad (3)$$

$$\arg(c_{L4}) = \arg\left(\frac{E_{L1,L}}{E_{L4,L}}c_{L1}\right) \quad (4)$$

$$E_{Ri,R}\frac{1}{\sqrt{2}}\left(a_\theta \rightarrow ja_\phi\right)\cdot E_{Ri} \quad (5)$$

$$\arg(c_{R2}) = \arg\left(\frac{E_{R1,R}}{E_{R2,R}}c_{R1}\right) \quad (6)$$

$$\arg(c_{R3}) = \arg\left(\frac{E_{R1,R}}{E_{R3,R}}c_{R1}\right) \quad (7)$$

$$\arg(c_{R4}) = \arg\left(\frac{E_{R1,R}}{E_{R4,R}}c_{R1}\right) \quad (8)$$

wherein a left-handed circularly polarized wave component $E_{Li,L}$ of a radiation field $E_{Li}$ (i=1 . . . 4) is obtained using the first formula, where $\alpha_\theta$ and $\alpha_\phi$ are unit vectors of the θ-direction and the ϕ-direction, respectively, when radiating the transmitting-left-handed circularly polarized waves, phases arg ($C_{L2}$), arg ($C_{L3}$), and arg ($C_{L4}$) of respective corresponding feed points are set based on the second formula, third formula, and fourth formula, $C_{L1}$, $C_{L2}$, $C_{L3}$, and $C_{L4}$ are excitation coefficients, a right-handed circularly polarized wave component $E_{Ri,R}$ of a radiation field $E_{Ri}$ (i=1, . . . , 4) is obtained using the fifth formula, when radiating the transmitting-right-handed circularly polarized waves, phases arg (cR2), arg (cR3), and arg (cR4) of respective corresponding feed points are determined based on the sixth formula, the seventh formula, and the eighth formula, and $C_{R1}$, $C_{R2}$, $C_{R3}$, and $C_{R4}$ are excitation coefficients.

2. The antenna device according to claim 1, wherein a number of the plurality of first antenna elements is N, N is an integer not less than 2, the plurality of first antenna elements includes an nth first antenna element, n is an integer not less than 1 and not more than N, a rotation angle of the nth first antenna element is 180°×i×n/N, and i is an integer not less than 1.

3. The antenna device according to claim 2, wherein a number of the plurality of first phase shifters for left-handed circular polarized wave is N, and a number of the plurality of first phase shifters for right-handed circular polarized wave is N.

4. The antenna device according to claim 1, wherein the plurality of first antenna elements each are configured to generate a transmitted linearly polarized wave by simultaneously radiating the transmitting-left-handed circularly polarized wave and the transmitting-right-handed circularly polarized wave, and the first control circuit is configured to change a relative phase shift amount between at least one of the plurality of first phase shifters for left-handed circular polarized wave and at least one of the plurality of first phase shifters for right-handed circular polarized wave based on the transmitted linearly polarized waves radiated by the plurality of first antenna elements.

5. The antenna device according to claim 1, further comprising:

a first amplitude adjustment circuit, the first amplitude adjustment circuit being couplable with at least one of the plurality of first phase shifters for left-handed circular polarized wave and at least one of the plurality of first phase shifters for right-handed circular polarized wave, the first control circuit being configured to control the first amplitude adjustment circuit based on a transmitted electromagnetic field radiated along the transmitting direction.

6. The antenna device according to claim 1, comprising:

a plurality of the first antenna parts.

7. A wireless device, comprising:

the antenna device according to claim 6; and an electrical circuit, the electrical circuit being couplable with the antenna device.

8. The antenna device according to claim 1, wherein the plurality of first antenna elements each are provided to be rotated to mutually-different orientations.

9. An antenna device, comprising:

a second antenna part including a plurality of second antenna elements configured to perform a first receiving operation in which a receiving-left-handed circularly polarized wave is received, and a second receiving operation in which a receiving-right-handed circularly polarized wave is received, a plurality of second phase shifters for left-handed circular polarized wave, one of the plurality of second phase shifters for left-handed circular polarized wave being configured to change a phase of the receiving-left-handed circularly polarized wave of one of the plurality of second antenna elements, and a plurality of second phase shifters for right-handed circular polarized wave, one of the plurality of second phase shifters for right-handed circular polarized wave being configured to change a phase of the receiving-right-handed circularly polarized wave of the one of the plurality of second antenna elements;

a second power divider couplable with the plurality of second phase shifters for left-handed circular polarized wave and the plurality of second phase shifters for right-handed circular polarized wave; and a second control circuit, an orientation of the one of the plurality of second antenna elements being different from an orientation of the other one of the plurality of second antenna elements, the second control circuit being configured to control phase shift amounts of the plurality of second phase shifters for left-handed circular polarized wave so that a plurality of the receiving-left-handed circularly polarized waves corresponding to the plurality of second antenna elements is synthesized to be substantially in-phase in a receiving direction of a received electromagnetic wave, the received electromagnetic wave including the receiving-left-handed circularly polarized waves and the receiving-right-handed circularly polarized waves, the second control circuit being configured to control phase shift amounts of the plurality of second phase shifters for right-handed circular polarized wave so that a plurality of the receiving-right-handed circularly polarized waves corresponding to the plurality of second antenna elements is synthesized to be substantially in-phase in the receiving direction, the second control circuit being configured to control the phase shift amounts based on following first to eighth formulae:

$$E_{Li,L} = \frac{1}{\sqrt{2}}(a_\theta \rightarrow ja_\phi) \cdot E_{Li} \quad (1)$$

$$\arg(c_{L2}) = \arg\left(\frac{E_{L1,L}}{E_{L2,L}} c_{L1}\right) \quad (2)$$

$$\arg(c_{L3}) = \arg\left(\frac{E_{L1,L}}{E_{L3,L}} c_{L1}\right) \quad (3)$$

$$\arg(c_{L4}) = \arg\left(\frac{E_{L1,L}}{E_{L4,L}} c_{L1}\right) \quad (4)$$

$$E_{Ri,R} \frac{1}{\sqrt{2}}(a_\theta \rightarrow ja_\phi) \cdot E_{Ri} \quad (5)$$

$$\arg(c_{R2}) = \arg\left(\frac{E_{R1,R}}{E_{R2,R}} c_{R1}\right) \quad (6)$$

$$\arg(c_{R3}) = \arg\left(\frac{E_{R1,R}}{E_{R3,R}} c_{R1}\right) \quad (7)$$

$$\arg(c_{R4}) = \arg\left(\frac{E_{R1,R}}{E_{R4,R}} c_{R1}\right) \quad (8)$$

wherein a left-handed circularly polarized wave component $E_{Li,L}$ of a radiation field $E_{Li}$ (i=1 . . . 4) is obtained using the first formula, where $\alpha_\theta$ and $\alpha_\phi$ are unit vectors of the θ-direction and the ϕ-direction, respectively, when receiving the receiving-left-handed circularly polarized waves, phases arg ($C_{L2}$), arg ($C_{L3}$), and arg ($C_{L4}$) of respective corresponding feed points are set based on the second formula, third formula, and fourth formula, $C_{L1}$, $C_{L2}$, $C_{L3}$, and $C_{L4}$ are excitation coefficients, a right-handed circularly polarized wave component $E_{Ri,R}$ of a radiation field $E_{Ri}$ (i=1, . . . , 4) is obtained using the fifth formula, when receiving the receiving-right-handed circularly polarized waves, phases arg (cR2), arg (cR3), and arg (cR4) of respective corresponding feed points are determined based on the sixth formula, the seventh formula, and the eighth formula, and $C_{R1}$, $C_{R2}$, $C_{R3}$, and $C_{R4}$ are excitation coefficients.

10. The antenna device according to claim 9, wherein a number of the plurality of second antenna elements is M, M is an integer not less than 2, the plurality of second antenna elements includes an mth second antenna element, m is an integer not less than 1 and not more than M, a rotation angle of the mth second antenna element is 180°×k×m/M, and k is an integer not less than 1.

11. The antenna device according to claim 10, wherein a number of the plurality of second phase shifters for left-handed circular polarized wave is M, and a number of the plurality of second phase shifters for right-handed circular polarized wave is M.

12. The antenna device according to claim 9, wherein the plurality of second antenna elements is configured to receive a linearly polarized wave, and the second control circuit is configured to change a relative phase shift amount between at least one of the plurality of second phase shifters for left-handed circular polarized wave and at least one of the plurality of second phase shifters for right-handed circular polarized wave based on the linearly polarized wave received by the plurality of second antenna elements.

13. The antenna device according to claim 9, further comprising:

a second amplitude adjustment circuit, the second amplitude adjustment circuit being couplable with at least one of the plurality of second phase shifters for left-handed circular polarized wave and at least one of the plurality of second phase shifters for right-handed circular polarized wave, the second control circuit being configured to control the second amplitude adjustment circuit based on the received electromagnetic wave.

14. The antenna device according to claim 9, comprising:

a plurality of the second antenna parts.

15. The antenna device according to claim 9, wherein the plurality of second antenna elements each are provided to be rotated to mutually-different orientations.

* * * * *